United States Patent
Fischer et al.

(10) Patent No.: US 8,119,778 B2
(45) Date of Patent: Feb. 21, 2012

(54) REVERSIBLY THERMOCHROMIC COMPOSITIONS

(75) Inventors: Walter Fischer, Reinach (CH); Abdel-Ilah Basbas, Basel (CH); Martin Brunner, Wallbach (CH); Rolf Benz, Muttenz (CH); Manuele Vitali, Bologna (IT)

(73) Assignee: BASF SE, Ludwigshafen (DE)

( * ) Notice: Subject to any disclaimer, the term of this patent is extended or adjusted under 35 U.S.C. 154(b) by 416 days.

(21) Appl. No.: 12/308,518

(22) PCT Filed: Jun. 20, 2007

(86) PCT No.: PCT/EP2007/056127
§ 371 (c)(1),
(2), (4) Date: Dec. 17, 2008

(87) PCT Pub. No.: WO2007/147843
PCT Pub. Date: Dec. 27, 2007

(65) Prior Publication Data
US 2010/0234494 A1  Sep. 16, 2010

(30) Foreign Application Priority Data
Jun. 23, 2006  (EP) ..................... 06115934

(51) Int. Cl.
*C09B 29/12* (2006.01)
*C09B 31/062* (2006.01)
*C09D 11/00* (2006.01)
*B41M 5/28* (2006.01)
*C09K 9/02* (2006.01)

(52) U.S. Cl. ........ 534/831; 534/834; 534/844; 534/883; 8/552; 8/556; 8/568; 106/31.47; 106/31.51

(58) Field of Classification Search .................. None
See application file for complete search history.

(56) References Cited

U.S. PATENT DOCUMENTS

| | | | |
|---|---|---|---|
| 5,037,448 A | 8/1991 | Kaul ............................. 8/539 |
| 5,068,318 A | 11/1991 | Decher et al. ............... 534/573 |
| 5,350,633 A | 9/1994 | Sumii et al. ............ 428/402.21 |
| 5,510,467 A | 4/1996 | Kaul et al. .................. 534/728 |
| 5,558,700 A | 9/1996 | Shibahashi et al. ........... 106/21 |
| 5,650,515 A | 7/1997 | Kaul et al. .................. 546/190 |

FOREIGN PATENT DOCUMENTS

| | | |
|---|---|---|
| CH | 307975 | 9/1955 |
| FR | 1455234 | 10/1966 |
| GB | 730384 | 5/1955 |
| GB | 2236536 | 4/1991 |
| NL | 7317211 | 6/1974 |
| WO | 93/18098 | 9/1993 |

OTHER PUBLICATIONS

Derwent Abstract 1995-013228 [02] for SU 1828858, Jul. 23, 1993.
H. S. Freeman et al., Dyes and Pigments, vol. 17, (1991), pp. 83-100.
Derwent Abstract 1979-36586B [19] for SU 589776, Sep. 11, 1978.
H. H. Hodgson et al., Journal of the Chemical Society, Part I, (1948), pp. 870-874.
E. Jusa et al., Monatschefte für Chemie, vol. 64, (1934), pp. 267-286.
E. Jusa et al., Monatschefte für Chemie, vol. 72, (1939), pp. 93-112.
S. B. Choudhury et al., J. Chem. Soc. Dalton Trans., Issue 1, (1992), pp. 107-112.
Th. Zincke et al., "Über 1,4-amido-naphthylmercaptan. II.", (Feb. 24, 1912), pp. 636-645.
Beilstein Data: Copyright 1988-2006, Registry No. 3367609.
A. Burawoy et al., o-Mercapto-azo-compounds, Part IV., (1954), pp. 82-90.
J. Schreiber et al., Collection Czechoslov. Chem. Commun., vol. 35, (1970) pp. 857-866.
K. B. Shaw et al., Canadian Journal of Chemistry, vol. 48, (1970), pp. 1404-1413.

*Primary Examiner* — Fiona T Powers
(74) *Attorney, Agent, or Firm* — Tyler A. Stevenson

(57) ABSTRACT

A reversible thermochromic system comprising a) a compound of the formula (I) or a tautomer thereof (I) wherein $R_1$ is $C_1$-$C_{18}$alkyl, $C_2$-$C_{18}$alkenyl, $C_3$-$C_{12}$cycloalkyl, $C_3$-$C_{12}$cycloalkyl substituted by 1, 2 or 3 $C_1$-$C_4$alkyl; or $C_7$-$C_{12}$phenylalkyl; $R_2$ and $R_3$ are hydrogen or $R_2$ and $R_3$ together form a group —CH=CH—CH=CH—; and $R_4$ is hydrogen, —$NO_2$, —$SO_2$—$R_1$ or (4-nitrophenyl)azo; and b) a compound containing a group of the formula (II).

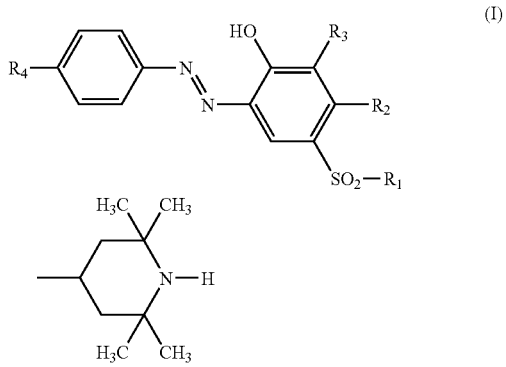

15 Claims, No Drawings

REVERSIBLY THERMOCHROMIC COMPOSITIONS

The present invention pertains to a reversible thermochromic system comprising a substituted 2-phenyl azo phenol and a 2,2,6,6-tetramethylpiperidine derivative, and to a composition comprising the reversible thermochromic system and a carrier material as well as to novel substituted 2-phenyl azo phenols.

Known reversible organic thermochromic systems consist of a basic color former such as a leuco dye and an acidic developer such as a phenolic compound. In cold, these components are a dark colored salt and upon heating they dissociate above a certain temperature to form a colourless mixture. On cooling the dark colored salt forms again. The major drawbacks are the poor photostability of the basic color former and the acidic developer and the color change may be retarded and such systems have a reduced thermal stability which is a disadvantage in plastic articles prepared by extrusion. A further drawback is that the system is colored only in one state (at cold temperature).

The system according to this invention does not have these disadvantages as the used compounds may have a greater photostability and less or no retarding of the color change. For instance, the color change is fully reversible and there is essentially no fatigue after many hot-cold cycles. The system or compound according to this invention changes color upon heating and turn back to the original color upon cooling. So at cold temperature the system or compound is in one chemical form and upon heating the system or compound changes color and is in another chemical form. In the instant case, one form (at higher temperature) is a 2-phenyl azo phenol derivative together with a 2,2,6,6-tetramethylpiperidine derivative and the other form (at cold temperature) is the corresponding salt formed by the corresponding 2-phenyl azo phenolate and the 2,2,6,6-tetramethylpiperidinium cation. In a cool surrounding, the color is, for example, purple or red which turns upon heating, for example, to orange or yellow. 2-Phenyl azo phenols are thermally quite stable so they can be extruded at high temperature which is required for incorporation into common thermoplastic polymers.

The present invention pertains in particular to a reversible thermochromic system comprising a) a compound of the formula (I) or a tautomer thereof

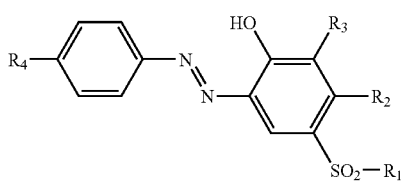
(I)

wherein
$R_1$ is $C_1$-$C_{18}$alkyl, $C_2$-$C_{18}$alkenyl, $C_3$-$C_{12}$cycloalkyl, $C_3$-$C_{12}$cycloalkyl substituted by 1, 2 or 3 $C_1$-$C_4$alkyl; or $C_7$-$C_{12}$-phenylalkyl;

$R_2$ and $R_3$ are hydrogen or $R_2$ and $R_3$ together form a group —CH═CH—CH═CH—; and $R_4$ is hydrogen, —NO$_2$, —SO$_2$—$R_1$ or (4-nitrophenyl)azo; and b) a compound containing a group of the formula

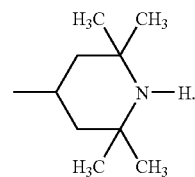

A corresponding tautomer of the compound of the formula (I) is for example

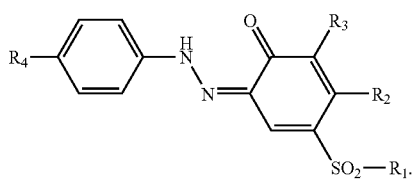

Examples of $C_1$-$C_{18}$ alkyl are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, 2-methylheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl and dodecyl. $C_1$-$C_{10}$alkyl is preferred. $C_1$-$C_4$ alkyl is particularly preferred.

Examples of $C_2$-$C_{18}$alkenyl are vinyl, allyl, butenyl, pentenyl, hexenyl, heptenyl, octenyl, nonenyl, decenyl, undecenyl and dodecenyl. The term alkenyl also comprises residues with more than one double bond that may be conjugated or non-conjugated. Alkenyl with one double bond, in particular allyl, is preferred.

Examples of $C_3$-$C_{12}$cycloalkyl are cyclopropyl, cyclobutyl, cyclopentyl and cyclohexyl. Cyclohexyl is preferred.

Examples of $C_3$-$C_{12}$cycloalkyl substituted by 1, 2 or 3 $C_1$-$C_4$alkyl are methylcyclopentyl, dimethylcyclopentyl and methylcyclohexyl.

A preferred example of $C_7$-$C_9$phenylalkyl is benzyl.

Compounds of the formula (I) wherein $R_3$ and $R_4$ together form a group —CH═CH—CH═CH— correspond to

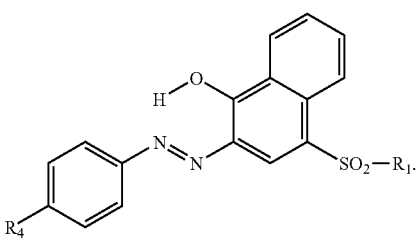

According to a preferred embodiment of the present invention $R_1$ is $C_1$-$C_{10}$alkyl, allyl, cyclohexyl or benzyl;

$R_2$ and $R_3$ are hydrogen or $R_2$ and $R_3$ together form a group —CH═CH—CH═CH—; and $R_4$ is hydrogen, —NO$_2$ or (4-nitrophenyl)azo.

According to another preferred embodiment of the present invention
$R_1$ is $C_1$-$C_4$alkyl;
$R_2$ and $R_3$ are hydrogen or $R_2$ and $R_3$ together form a group —CH═CH—CH═CH—; and
$R_4$ is hydrogen, —$NO_2$, or (4-nitrophenyl)azo.

Suitable examples of component b) are listed below:
A compound of the formula (A-1)

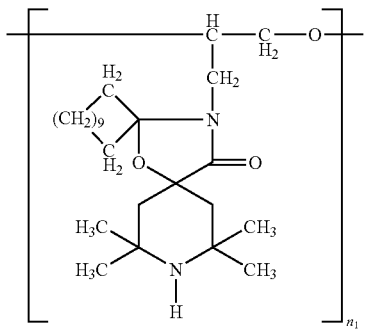
(A-1)

wherein $n_1$ is a number from 2 to 50.
A compound of the formula (A-2)

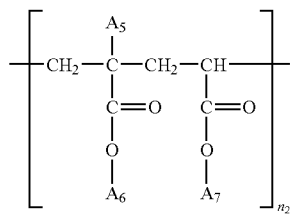
(A-2)

wherein $n_2$ is a number from 2 to 50,
$A_5$ is hydrogen or $C_1$-$C_4$alkyl,
the radicals $A_6$ and $A_7$ independently of one another are $C_1$-$C_4$alkyl or a group of the formula (a-I)

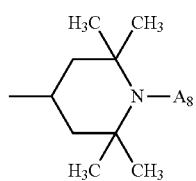
(a-I)

wherein $A_8$ is hydrogen; with the proviso that at least 50% of the radicals $A_7$ are a group of the formula (a-I).
A compound of the formula (B-1)

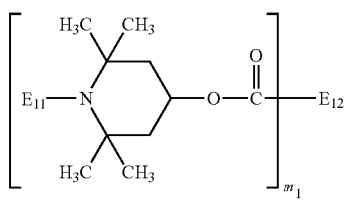
(B-1)

in which
$E_{11}$ is hydrogen,
$m_1$ is 1, 2 or 4,
if $m_1$ is 1, $E_{12}$ is $C_1$-$C_{25}$alkyl,
if $m_1$ is 2, $E_{12}$ is $C_1$-$C_{14}$alkylene or a group of the formula (b-I)

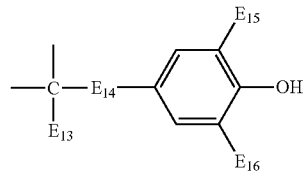
(b-I)

wherein $E_{13}$ is $C_1$-$C_{10}$alkyl or $C_2$-$C_{10}$alkenyl, $E_{14}$ is $C_1$-$C_{10}$alkylene, and
$E_{15}$ and $E_{16}$ independently of one another are $C_1$-$C_4$alkyl, cyclohexyl or methylcyclohexyl, and if $m_1$ is 4, $E_{12}$ is $C_1$-$C_{10}$alkanetetrayl.
A compound of the formula (B-2)

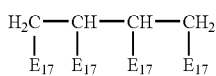
(B-2)

in which two of the radicals $E_{17}$ are —COO—($C_1$-$C_{20}$alkyl), and
two of the radicals $E_{17}$ are a group of the formula (b-II)

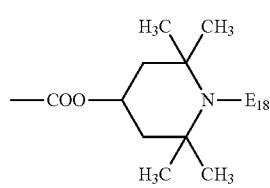
(b-II)

with $E_{18}$ being hydrogen.
A compound of the formula (B-3)

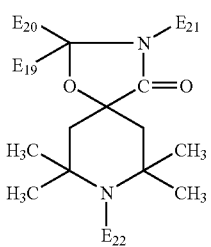
(B-3)

in which $E_{19}$ and $E_{20}$ together form $C_2$-$C_{14}$alkylene,
$E_{21}$ is hydrogen or a group —$Z_1$—COO—$Z_2$,
$Z_1$ is $C_2$-$C_{14}$alkylene, and
$Z_2$ is $C_1$-$C_{24}$alkyl, and
$E_{22}$ is hydrogen.
A compound of the formula (B-4)

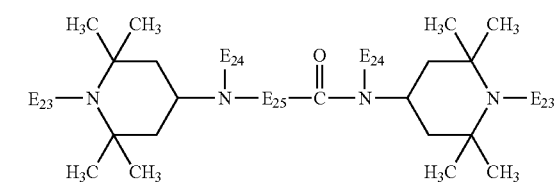
(B-4)

wherein the radicals $E_{23}$ are hydrogen,
the radicals $E_{24}$ independently of one another are hydrogen or $C_1$-$C_{12}$alkyl, and
$E_{25}$ is $C_1$-$C_{10}$alkylene or $C_3$-$C_{10}$alkylidene.

A compound of the formula (B-5)

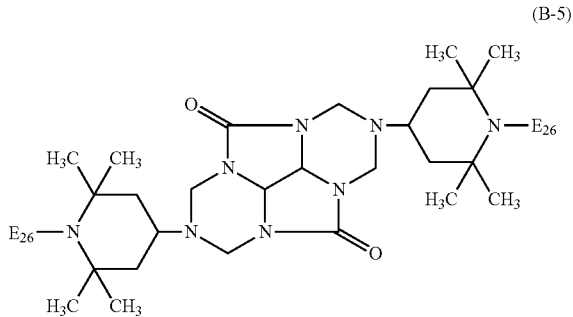
(B-5)

wherein the radicals $E_{26}$ are hydrogen.

A compound of the formula (B-6)

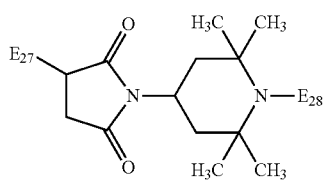
(B-6)

in which $E_{27}$ is $C_1$-$C_{24}$alkyl, and
$E_{28}$ is hydrogen.

A compound of the formula (B-7)

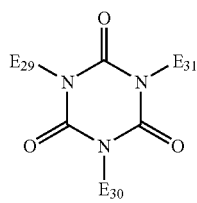
(B-7)

in which $E_{29}$, $E_{30}$ and $E_{31}$ independently of one another are a group of the formula (b-III)

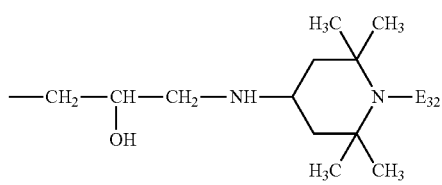
(b-III)

wherein $E_{32}$ is hydrogen.

A compound of the formula (B-8)

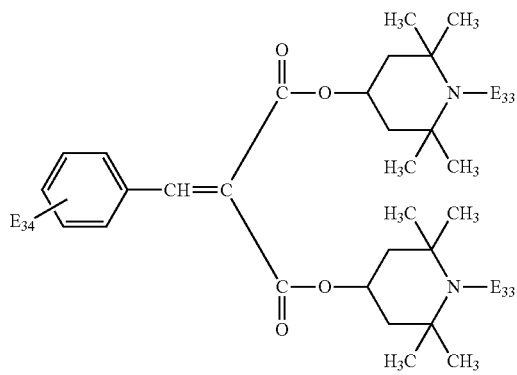
(B-8)

wherein
the radicals $E_{33}$ are hydrogen,
and $E_{34}$ is hydrogen, $C_1$-$C_{12}$alkyl or $C_1$-$C_{12}$alkoxy.

A compound of the formula (B-9)

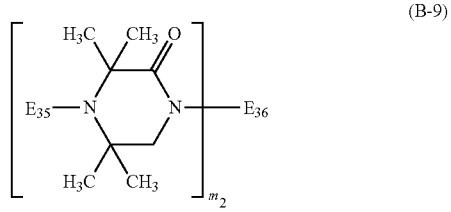
(B-9)

wherein $m_2$ is 1, 2 or 3,
$E_{35}$ is hydrogen, and
when $m_2$ is 1, $E_{36}$ is a group —CH$_2$CH$_2$—NH—⟨cyclohexyl⟩, when $m_2$ is 2, $E_{36}$ is $C_2$-$C_{22}$alkylene, and
when $m_2$ is 3, $E_{36}$ is a group of the formula (b-IV)

(b-IV)

wherein the radicals $E_{37}$ independently of one another are $C_2$-$C_{12}$alkylene, and the radicals $E_{38}$ independently of one another are $C_1$-$C_{12}$alkyl or $C_5$-$C_{12}$cycloalkyl.

A compound of the formula (B-10)

(B-10)

wherein
the radicals $E_{39}$ are hydrogen, and
$E_{40}$ is $C_2$-$C_{22}$alkylene, $C_5$-$C_7$cycloalkylene, $C_1$-$C_4$alkylenedi($C_5$-$C_7$cycloalkylene), phenylene or phenylenedi($C_1$-$C_4$alkylene).

A compound of the formula (C-1)

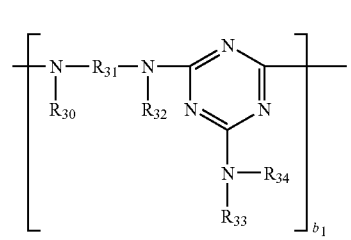
(C-1)

in which $R_{30}$, $R_{32}$, $R_{33}$ and $R_{34}$ independently of one another are hydrogen, $C_1$-$C_{12}$alkyl, $C_5$-$C_{12}$cycloalkyl, $C_1$-$C_4$-alkyl-substituted $C_5$-$C_{12}$cycloalkyl, phenyl, phenyl which is substituted by —OH and/or $C_1$-$C_{10}$alkyl; $C_7$-$C_9$phenylalkyl, $C_7$-$C_9$-phenylalkyl which is substituted on the phenyl radical by —OH and/or $C_1$-$C_{10}$alkyl; or a group of the formula (c-I)

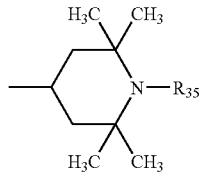

(c-I)

$R_{31}$ is $C_2$-$C_{18}$alkylene, $C_5$-$C_7$cycloalkylene or $C_1$-$C_4$alkylenedi($C_5$-$C_7$cycloalkylene), or the radicals $R_{30}$, $R_{31}$ and $R_{32}$, together with the nitrogen atoms to which they are bonded, perform a 5- to 10-membered heterocyclic ring, or
$R_{33}$ and $R_{34}$, together with the nitrogen atom to which they are bonded, form a 5- to 10-membered heterocyclic ring,
$R_{35}$ is hydrogen, and
$b_1$ is a number from 2 to 50,
with the proviso that at least one of the radicals $R_{30}$, $R_{32}$, $R_{33}$ and $R_{34}$ is a group of the formula (c-I).

A compound of the formula (C-2)

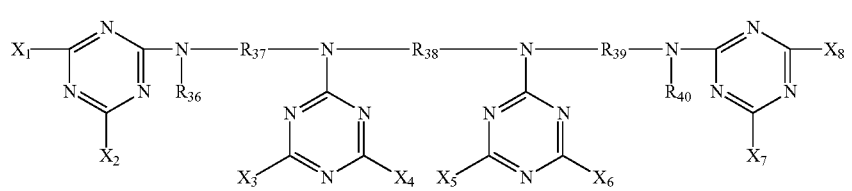

(C-2)

wherein $R_{36}$ and $R_{40}$ independently of one another are hydrogen or $C_1$-$C_{10}$alkyl,
$R_{37}$, $R_{38}$ and $R_{39}$ independently of one another are $C_2$-$C_{10}$alkylene, and
$X_1$, $X_2$, $X_3$, $X_4$, $X_5$, $X_6$, $X_7$ and $X_8$ independently of one another are a group of the formula (c-II),

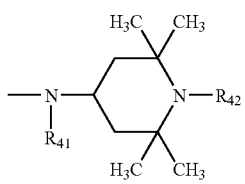

(c-II)

in which $R_{41}$ is hydrogen, $C_1$-$C_{12}$alkyl, $C_5$-$C_{12}$cycloalkyl, $C_1$-$C_4$alkyl-substituted $C_5$-$C_{12}$cycloalkyl, phenyl, —OH- and/or $C_1$-$C_{10}$alkyl-substituted phenyl, $C_7$-$C_9$-phenylalkyl, $C_7$-$C_9$-phenylalkyl which is substituted on the phenyl radical by —OH and/or $C_1$-$C_{10}$alkyl; or a group of the formula (c-I) as defined above, and
$R_{42}$ is hydrogen.

A compound of the formula (C-3)

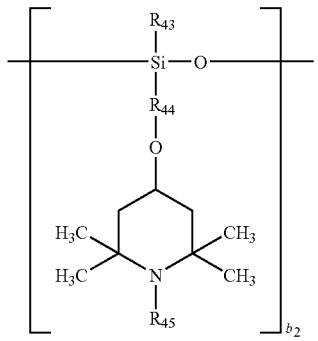

(C-3)

in which
$R_{43}$ is $C_1$-$C_{10}$alkyl, $C_5$-$C_{12}$cycloalkyl, $C_1$-$C_4$alkyl-substituted $C_5$-$C_{12}$cycloalkyl, phenyl or $C_1$-$C_{10}$alkyl-substituted phenyl,
$R_{44}$ is $C_3$-$C_{10}$alkylene,
$R_{45}$ is hydrogen, and
$b_2$ is a number from 2 to 50.

A compound of the formula (C-4)

(C-4)

in which
$R_{46}$ and $R_{50}$ independently of one another are a direct bond or a —N($X_9$)—CO—$X_{10}$—CO—N($X_{11}$)— group, where $X_9$ and $X_{11}$ independently of one another are hydrogen, $C_1$-$C_8$alkyl, $C_5$-$C_{12}$cycloalkyl, phenyl, $C_7$-$C_9$-phenylalkyl or a group of the formula (c-I),
$X_{10}$ is a direct bond or $C_1$-$C_4$alkylene,
$R_{47}$ is hydrogen,
$R_{48}$, $R_{49}$, $R_{52}$ and $R_{53}$ independently of one another are hydrogen, $C_1$-$C_{30}$alkyl, $C_5$-$C_{12}$cycloalkyl or phenyl,
$R_{51}$ is hydrogen, $C_1$-$C_{30}$alkyl, $C_5$-$C_{12}$cycloalkyl, phenyl, $C_7$-$C_9$-phenylalkyl or a group of the formula (c-I), and
$b_3$ is a number from 1 to 50.

A compound of the formula (C-5)

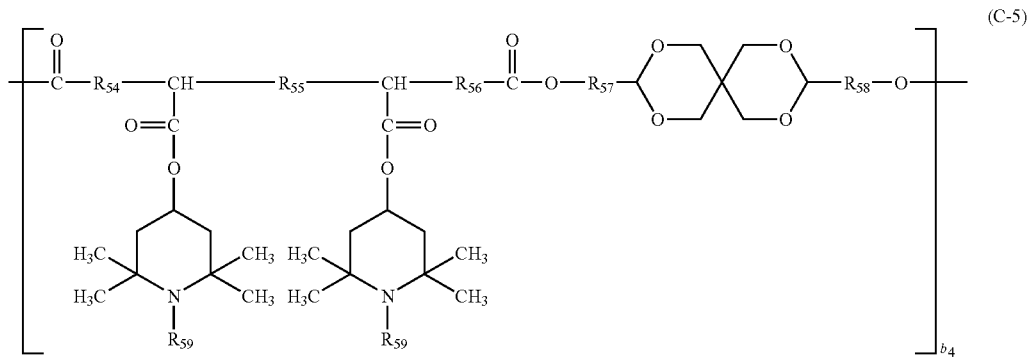

in which
$R_{54}, R_{55}, R_{56}, R_{57}$ and $R_{58}$ independently of one another are a direct bond or $C_1$-$C_{10}$alkylene,
$R_{59}$ is hydrogen, and
$b_4$ is a number from 1 to 50.

A compound of the formula (C-6-a)

Examples of $C_5$-$C_{12}$cycloalkyl are cyclopentyl, cyclohexyl, cycloheptyl, cyclooctyl and cyclododecyl. $C_5$-$C_5$Cycloalkyl, especially cyclohexyl, is preferred.

—OH- and/or $C_1$-$C_{10}$alkyl-substituted phenyl is for example methylphenyl, dimethylphenyl, trimethylphenyl, tert-butylphenyl or 3,5-di-tert-butyl-4-hydroxyphenyl.

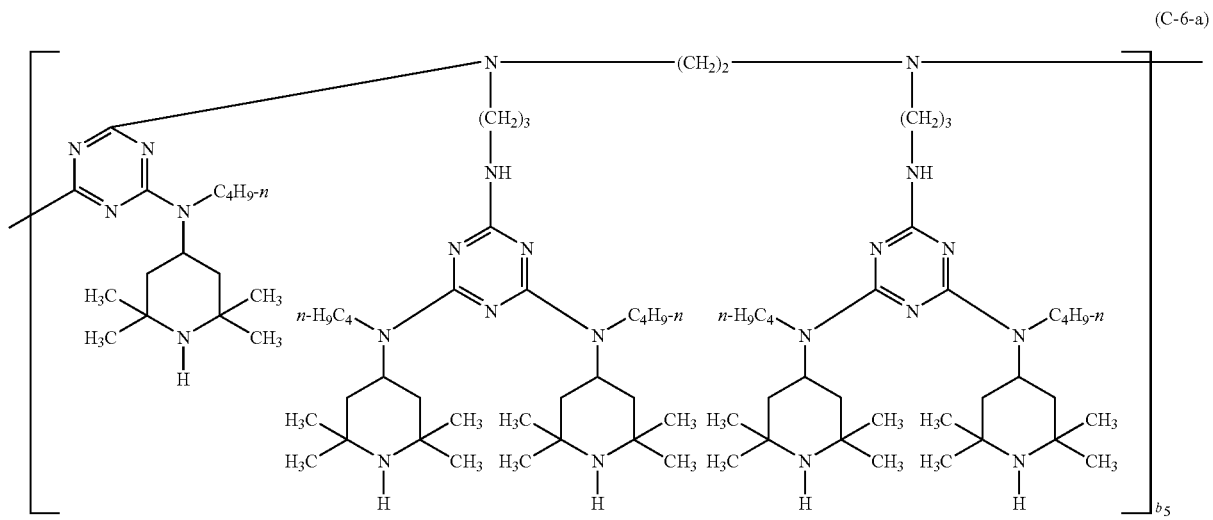

wherein $b_5$ is a number from 2 to 20.

For the sterically hindered amines, the mentioned terms comprise, for instance, the following meanings:

Examples of alkyl having up to 30 carbon atoms are methyl, ethyl, propyl, isopropyl, n-butyl, sec-butyl, isobutyl, tert-butyl, 2-ethylbutyl, n-pentyl, isopentyl, 1-methylpentyl, 1,3-dimethyl-butyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl, docosyl and triacontyl.

Examples of alkoxy having up to 18 carbon atoms are methoxy, ethoxy, propoxy, isopropoxy, butoxy, isobutoxy, pentoxy, isopentoxy, hexoxy, heptoxy, octoxy, decyloxy, dodecyloxy, tetradecyloxy, hexadecyloxy and octadecyloxy. $E_{34}$ is preferably $C_1$-$C_4$alkoxy.

Examples of $C_7$-$C_9$-phenylalkyl are benzyl and phenylethyl.

$C_7$-$C_9$Phenylalkyl which is substituted on the phenyl radical by —OH and/or by alkyl having up to 10 carbon atoms is for example methylbenzyl, dimethylbenzyl, trimethylbenzyl, tert-butylbenzyl or 3,5-di-tert-butyl-4-hydroxybenzyl.

Examples of alkenyl having up to 10 carbon atoms are allyl, 2-methallyl, butenyl, pentenyl and hexenyl. Allyl is preferred. The carbon atom in position 1 is preferably saturated.

$C_1$-$C_8$Alkanoyl, $C_3$-$C_8$alkenyl and benzoyl are preferred. Acetyl and acryloyl are especially preferred.

Examples of alkylene having up to 22 carbon atoms are methylene, ethylene, propylene, trimethylene, tetramethylene, pentamethylene, 2,2-dimethyltrimethylene, hexamethylene, trimethylhexamethylene, octamethylene and decamethylene.

An example of $C_3$-$C_{10}$alkylidene is the group

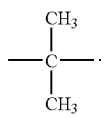

An example of $C_4$-$C_{10}$alkanetetrayl is 1,2,3,4-butanetetrayl.

An example of $C_5$-$C_7$cycloalkylene is cyclohexylene.

An example of $C_1$-$C_4$alkylenedi($C_5$-$C_7$cycloalkylene) is methylenedicyclohexylene.

An example of phenylenedi($C_1$-$C_4$alkylene) is methylene-phenylene-methylene or ethylene-phenylene-ethylene.

Where the radicals $R_{30}$, $R_{31}$ and $R_{32}$, together with the nitrogen atoms to which they are attached, form a 5- to 10-membered heterocyclic ring, this ring is for example

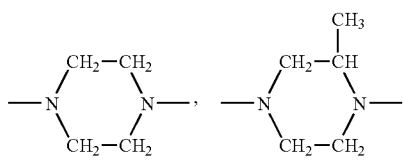

A 6-membered heterocyclic ring is preferred.

Where the radicals $R_{33}$ and $R_{34}$, together with the nitrogen atom to which they are attached, form a 5- to 10-membered heterocyclic ring, this ring is for example 1-pyrrolidyl, piperidino, morpholino, 1-piperazinyl, 4-methyl-1-piperazinyl, 1-hexahydroazepinyl, 5,5,7-trimethyl-1-homopiperazinyl or 4,5,5,7-tetramethyl-1-homopiperazinyl. Morpholino is particularly preferred.

One of the preferred definitions of $R_{48}$ and $R_{52}$ is phenyl. $R_{55}$ is preferably a direct bond.

$n_1$ and $n_2$ are preferably a number from 2 to 25, in particular 2 to 20.

$b_1$ and $b_2$ are preferably a number from 2 to 25, in particular 2 to 20.

$b_3$ and $b_4$ are preferably a number from 1 to 25, in particular 1 to 20.

The 2,2,6,6-tetramethylpiperidine derivatives described above are essentially known and commercially available. All of them can be prepared by known processes.

The preparation of the 2,2,6,6-tetramethylpiperidine derivatives which contain A in the denotation of the formula is disclosed for example in EP-A-28,318 and EP-A-1,803.

The preparation of the 2,2,6,6-tetramethylpiperidine derivatives which contain B in the denotation of the formula is disclosed for example in U.S. Pat. No. 5,679,733, U.S. Pat. No. 3,640,928, U.S. Pat. No. 4,198,334, U.S. Pat. No. 5,204,473, U.S. Pat. No. 4,619,958, U.S. Pat. No. 4,110,306, U.S. Pat. No. 4,110,334, U.S. Pat. No. 4,689,416, U.S. Pat. No. 4,408,051, SU-A-768,175 (Derwent 88-138,751/20), U.S. Pat. No. 5,049,604, U.S. Pat. No. 4,769,457, U.S. Pat. No. 4,356,307, U.S. Pat. No. 4,619,956, U.S. Pat. No. 5,182,390, GB-A-2,269,819, U.S. Pat. No. 4,292,240, U.S. Pat. No. 5,026,849, U.S. Pat. No. 5,071,981, U.S. Pat. No. 4,547,538 and U.S. Pat. No. 4,976,889.

The preparation of the 2,2,6,6-tetramethylpiperidine derivatives which contain C in the denotation of the formula is disclosed for example in U.S. Pat. No. 4,086,204, U.S. Pat. No. 6,046,304, U.S. Pat. No. 4,331,586, U.S. Pat. No. 4,108,829, U.S. Pat. No. 5,051,458, WO-A-94/12,544 (Derwent 94-177,274/22), DD-A-262,439 (Derwent 89-122,983/17), U.S. Pat. No. 4,857,595, U.S. Pat. No. 4,529,760 and U.S. Pat. No. 4,477,615 and CAS 136, 504-96-6.

The following commercially available products are suitable as sterically hindered amines: FERRO® AM 806 (CAS 70800-09-8), DASTIB® 845 (CAS 24860-22-8), TINUVIN® 770 (CAS 58829-07-9), ADK STAB® LA 57 (CAS 64022-61-3), ADK STAB® LA 67 (CAS 100631-43-4), HOSTAVIN® N 20 (CAS 64338-16-5), HOSTAVIN® N 24 (CAS 85099-51-0 and 85099-50-9), SANDUVOR® 3050 (CAS 85099-51-0 and 85099-50-9), DIACETAM® 5 (CAS 76505-58-3), SUMISORB® TM 61 (CAS 84214-94-2), UVINUL® 4049 (CAS 109423-00-9), GOODRITE® UV 3034 (CAS 71029-16-8), GOODRITE® UV 3150 (CAS 96204-36-3), GOODRITE® 3110×128, UVINUL® 4050H (CAS 124172-53-8), CHIMASSORB® 944 (CAS 71878-19-8), CHIMASSORB® 2020 (CAS 192268-64-7), CYASORB® UV 3346 (CAS 82451-48-7), DASTIB® 1082 (CAS 113169-96-3), UVASIL® 299 (CAS 164648-93-5), UVASIL® 125 (CAS 164648-93-5), UVASIL® 2000 (CAS 164648-93-5), UVINUL® 5050H (CAS 152261-33-1 and 199237-39-3), LICHTSCHUTZSTOFF® UV 31, LUCHEM® HA B 18, ADK STAB® LA 68 (CAS 100631-44-5) or UVASORB® HA 88 (CAS 136504-96-6).

GOODRITE® 3110×128 is of formula

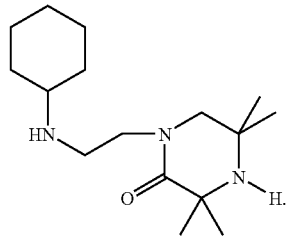

The meanings of the terminal groups which saturate the free valences in the compounds of the formulae (A-1), (A-2), (C-1), (C-3), (C-4), (C-5) and (C-6-a) depend on the processes used for their preparation. The terminal groups can also be modified after the preparation of the compounds.

In the compounds of the formula (A-1), the terminal group bonded to the dimethylene radical can be, for example, —OH, and the terminal group bonded to the oxygen can be, for example, hydrogen. The terminal groups can also be polyether radicals.

In the compounds of the formula (A-2), the end group bonded to the —$CH_2$— residue can be, for example, hydrogen and the end group bonded to the —$CH(CO_2A_7)$ residue can be, for example, —CH=CH—$COOA_7$.

If the compounds of the formula (C-1) are prepared by reacting a compound of the formula

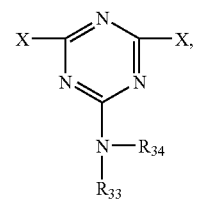

in which X is, for example, halogen, in particular chlorine, and $R_{33}$ and $R_{34}$ are as defined above, with a compound of the formula

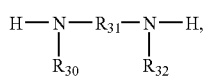

in which $R_{30}$, $R_{31}$ and $R_{32}$ are as defined above, the terminal group bonded to the diamino radical is hydrogen or

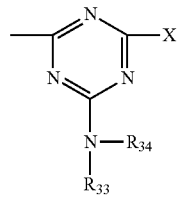

and the terminal group bonded to the triazine radical is X or

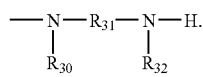

If X is halogen, it is advantageous to replace this, for example, by —OH or an amino group when the reaction is complete. Examples of amino groups which may be mentioned are pyrrolidin-1-yl, morpholino, —$NH_2$, —N($C_1$-$C_8$)alkyl)$_2$ and —NR($C_1$-$C_8$alkyl), in which R is hydrogen or a group of the formula (c-I).

The compounds of the formula (C-1) also cover compounds of the formula

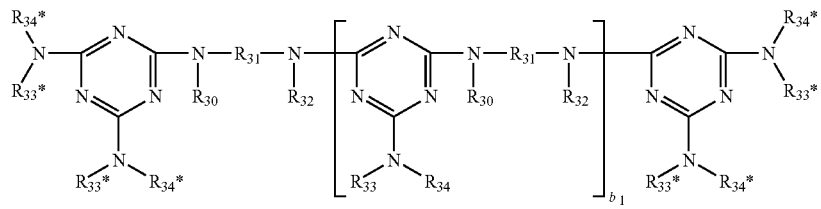

wherein $R_{30}$, $R_{31}$, $R_{32}$, $R_{33}$, $R_{34}$ and $b_1$ are as defined above and $R_{33}$* has one of the meanings of $R_{33}$ and $R_{34}$* has one of the meanings of $R_{34}$.

One of the particularly preferred compounds of the formula (C-1) is

The preparation of this compound is described in Example 10 of U.S. Pat. No. 6,046,304.

In the compounds of the formula (C-3), the terminal group bonded to the silicon atom can be, for example, ($R_{43}$)$_3$Si—O—, and the terminal group bonded to the oxygen can be, for example, —Si($R_{43}$)$_3$.

The compounds of the formula (C-3) can also be in the form of cyclic compounds if $b_2$ is a number from 3 to 10, i.e. the free valences shown in the structural formula then form a direct bond.

In the compounds of the formula (C-4), the terminal group bonded to the 2,5-dioxopyrrolidine ring is, for example, hydrogen, and the terminal group bonded to the —C($R_{52}$)($R_{53}$)— radical is, for example,

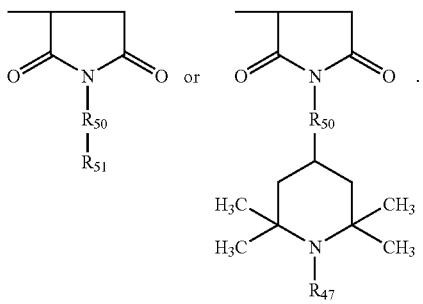

In the compounds of the formula (C-5), the terminal group bonded to the carbonyl radical is, for example,

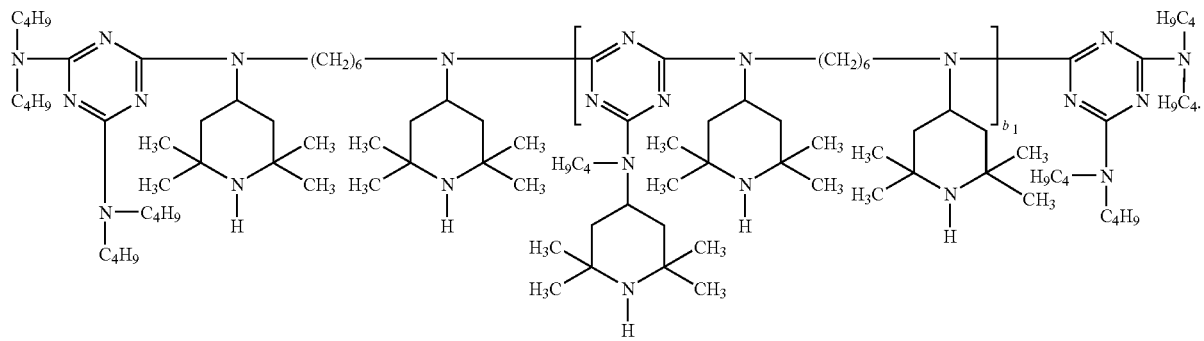

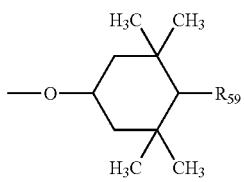

and the terminal group bonded to the oxygen radical is, for example,

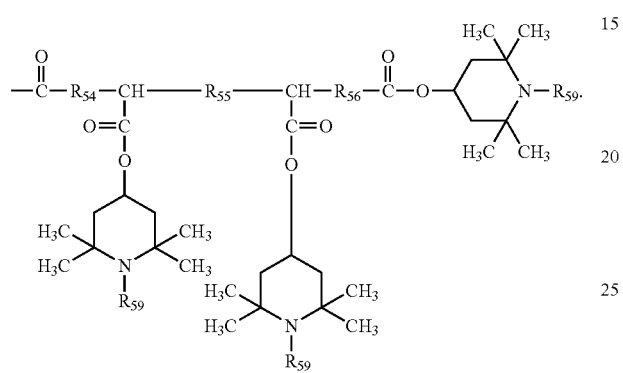

In the compounds of the formula (C-6-a), the terminal group bonded to the triazine radical is, for example, Cl or a

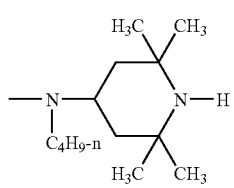

group, and the terminal group bonded to the amino radical is, for example, hydrogen or a

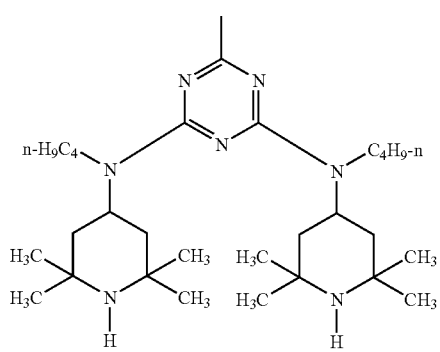

group.

Of interest is a sterically hindered amine that corresponds to a compound of the formula (A-1) or (A-2);

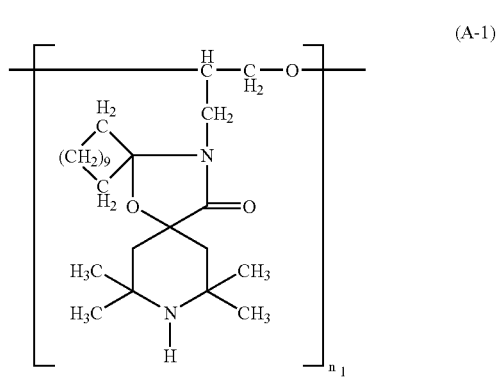

wherein $n_1$ and $n_2$ are a number from 2 to 20, and at least 50% of the radicals $A_7$ are a group of the formula (a-I)

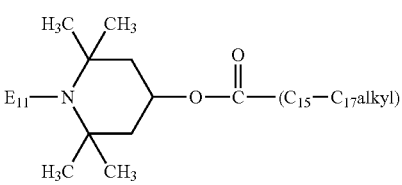

wherein $A_8$ is hydrogen;

and the remaining radicals $A_7$ are ethyl.

For example, the sterically hindered amine is a compound of the formula (B-1-a), (B-1-b), (B-1-c), (B-1-d), (B-2-a), (B-3-a), (B-3-b), (B-4-a), (B-4-b), (B-5), (B-6-a), (B-7), (B-8-a), (B-9-a), (B-9-b), (B-9-c) or (B-10-a);

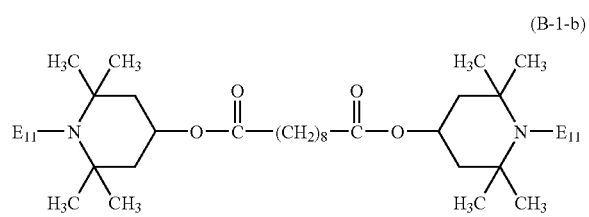

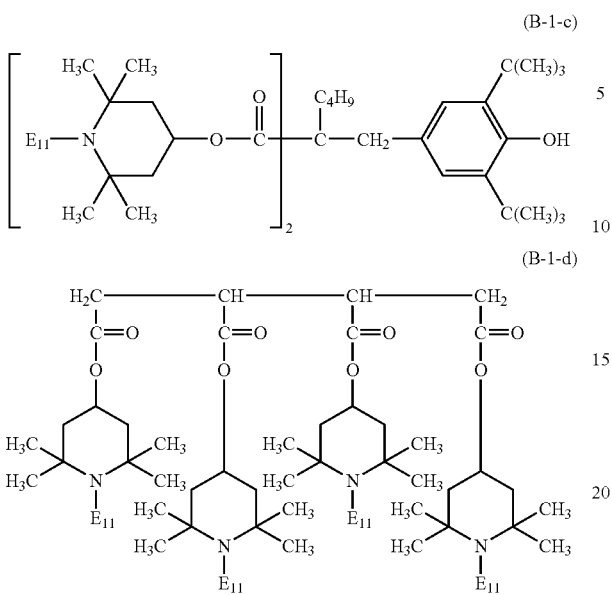
(B-1-c)
(B-1-d)
wherein $E_{11}$ is hydrogen;
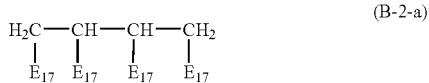
(B-2-a)
in which two of the radicals $E_{17}$ are —COO—$C_{13}H_{27}$ and two of the radicals $E_{17}$ are
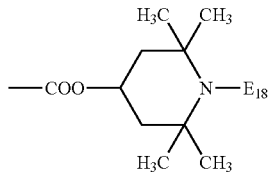
and $E_{18}$ is hydrogen;
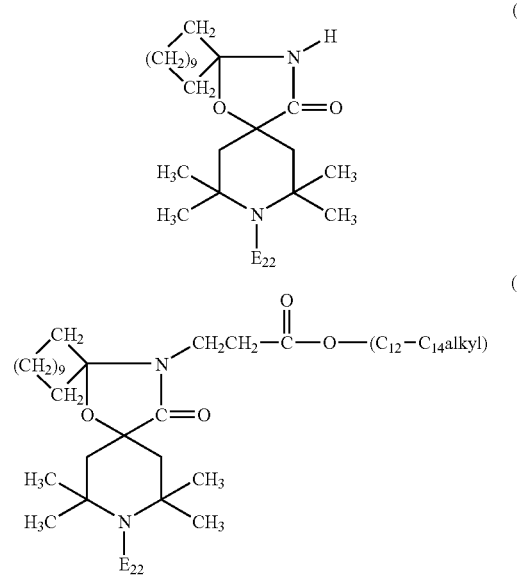
(B-3-a)
(B-3-b)
wherein $E_{22}$ is hydrogen;
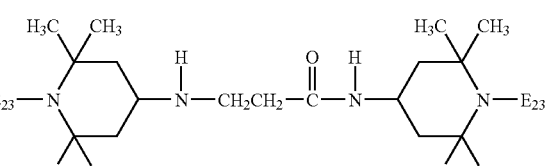
(B-4-a)
(B-4-b)
wherein $E_{23}$ hydrogen;
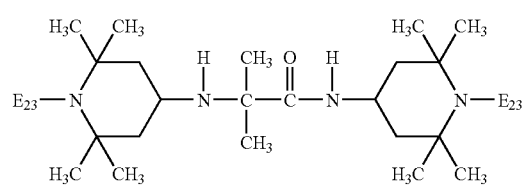
(B-5)
wherein $E_{26}$ is hydrogen;
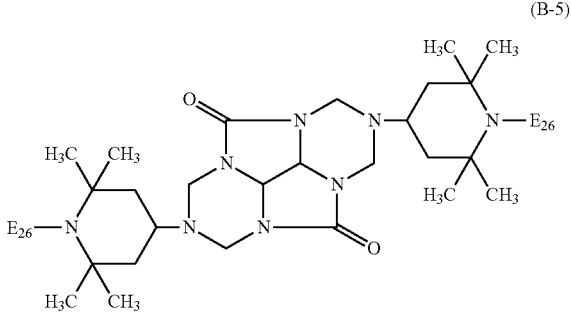
(B-6-a)
wherein $E_{28}$ is hydrogen;
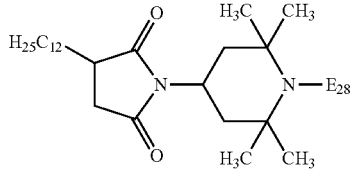
(B-7)
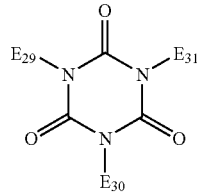
in which $E_{29}$, $E_{30}$ and $E_{31}$ independently of one another are a group of the formula (b-III)
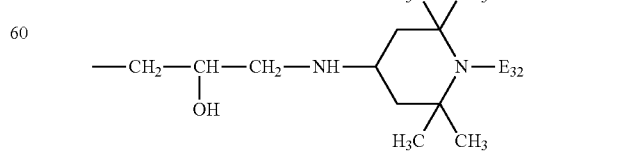
(b-III)
wherein $E_{32}$ is hydrogen;

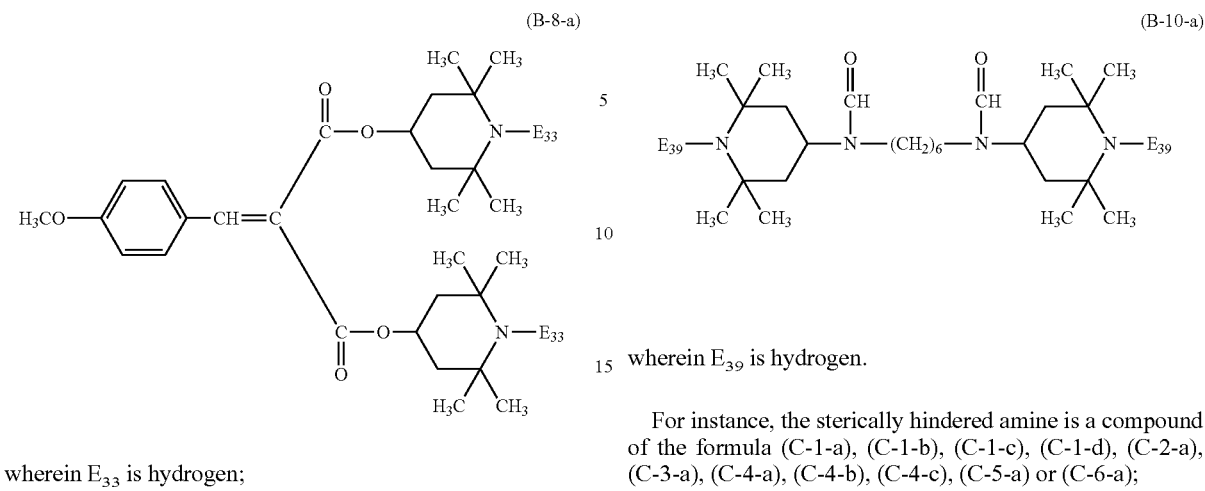
wherein $E_{33}$ is hydrogen;
wherein $E_{39}$ is hydrogen.
For instance, the sterically hindered amine is a compound of the formula (C-1-a), (C-1-b), (C-1-c), (C-1-d), (C-2-a), (C-3-a), (C-4-a), (C-4-b), (C-4-c), (C-5-a) or (C-6-a);
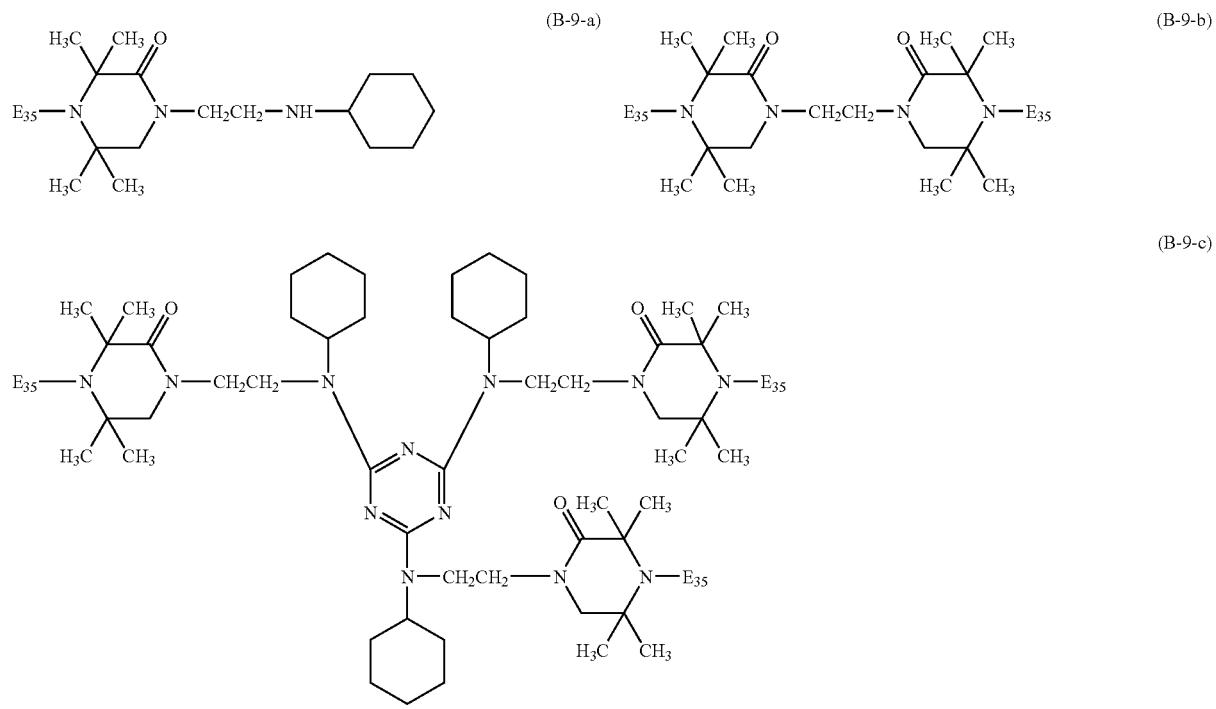
wherein $E_{35}$ is hydrogen;
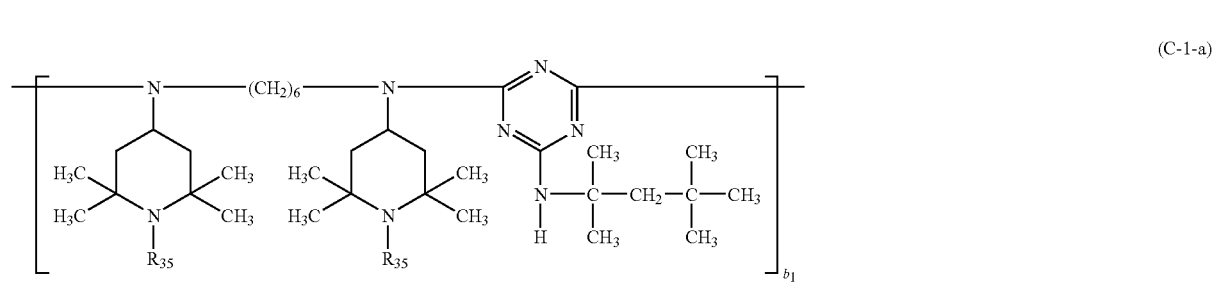

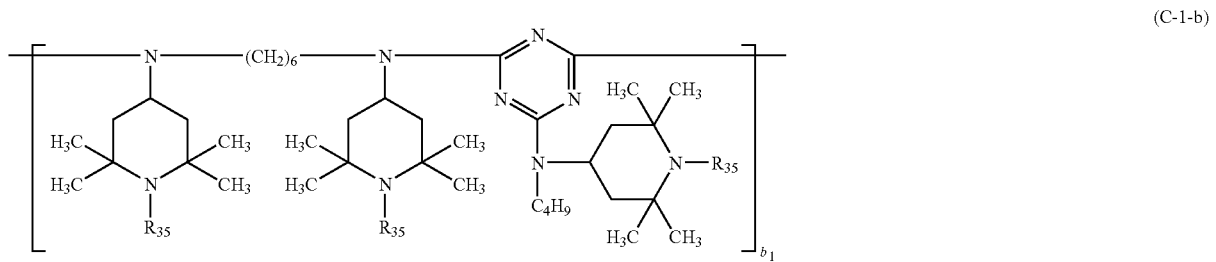
(C-1-b)
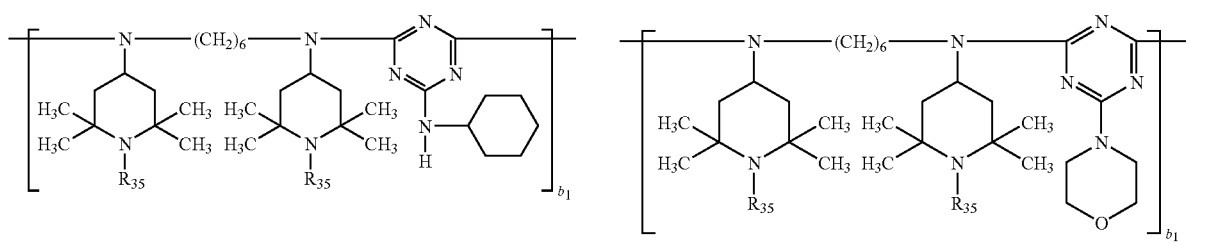
(C-1-c)
(C-1-d)
wherein $b_1$ is a number from 2 to 20 and $R_{35}$ is hydrogen;
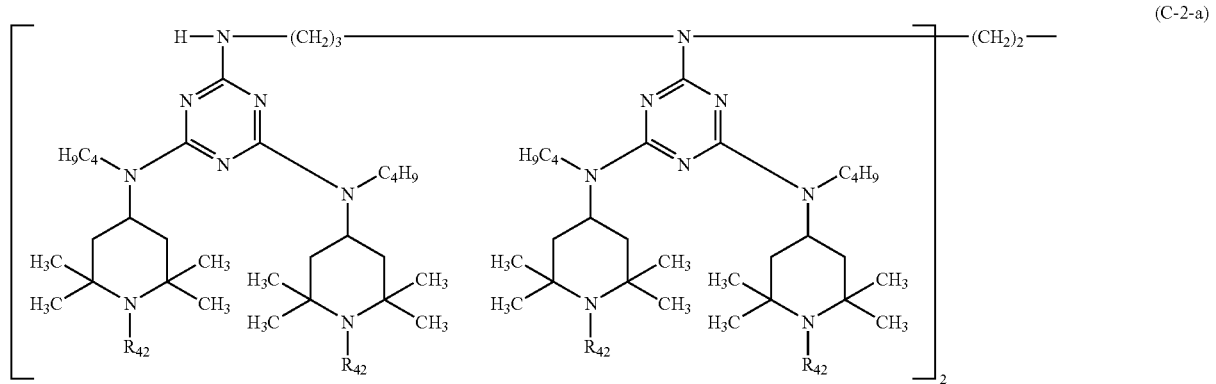
(C-2-a)
wherein $R_{42}$ is hydrogen,
(C-3-a)
wherein $b_2$ is a number from 2 to 20 and $R_{45}$ is hydrogen;

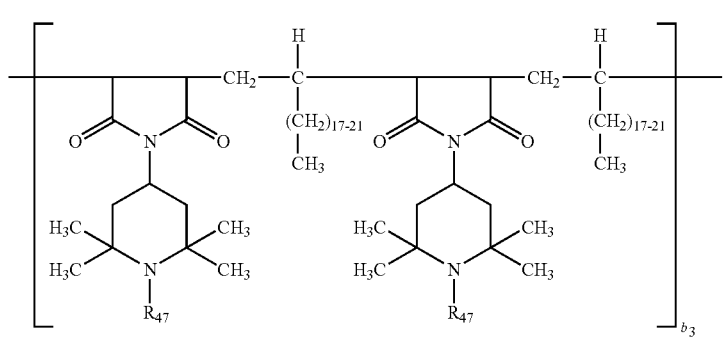
(C-4-a)
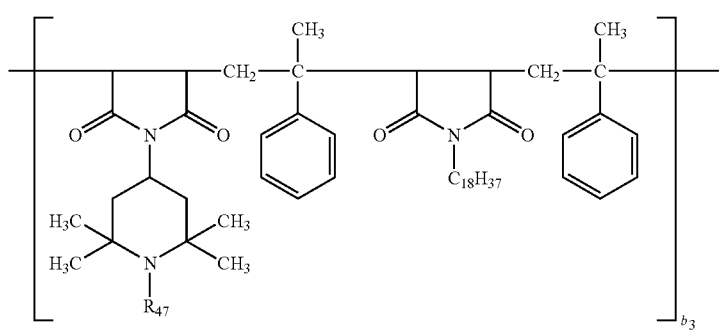
(C-4-b)
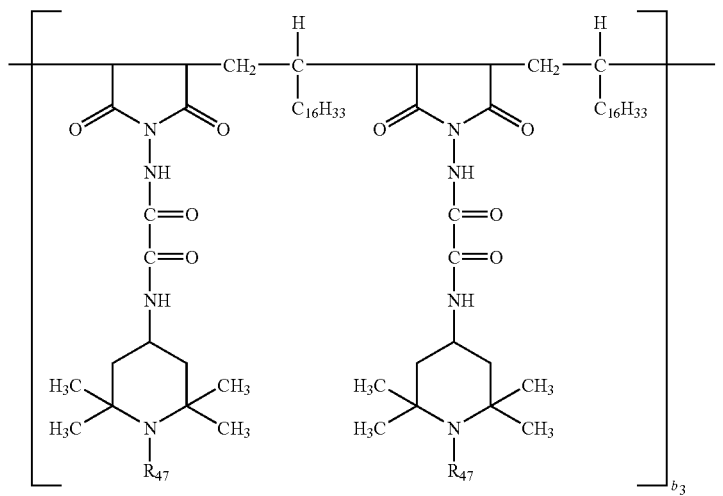
(C-4-c)
wherein $b_3$ is a number from 1 to 20 and $R_{47}$ is hydrogen;
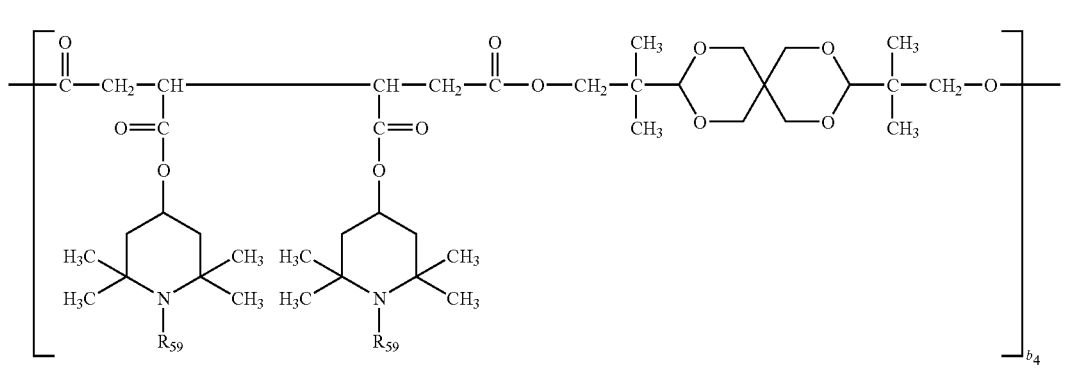
(C-5-a)
wherein $b_4$ is a number from 1 to 20 and $R_{59}$ is hydrogen;

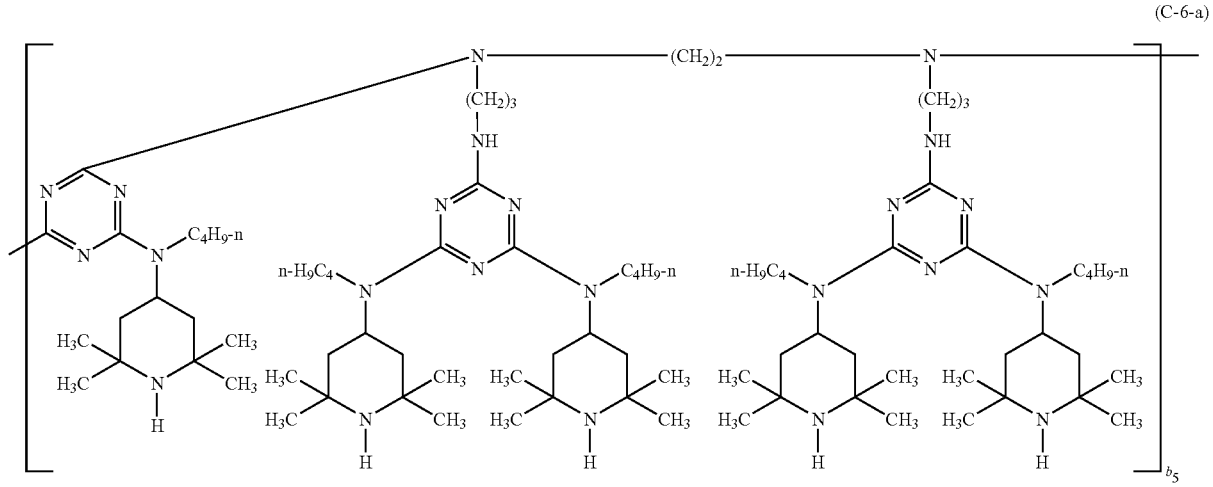

(C-6-a)

wherein $b_5$ is a number from 2 to 20.

Of interest are the following commercially available compounds:
TINUVIN® 770 corresponds to the compound of the formula (B-1-b) wherein $E_{11}$ is hydrogen.
ADK STAB® LA 57 corresponds to the compound of the formula (B-2-d) wherein $E_{11}$ is hydrogen.
ADK STAB® LA 67 corresponds to the compound of the formula (B-3-a) wherein $E_{18}$ is hydrogen.
HOSTAVIN® N 24 corresponds to the compound of the formula (B-3-b) wherein $E_{22}$ is hydrogen.
SANDUVOR® 3050 corresponds to the compound of the formula (B-3-b-1) shown below, wherein $E_{22}$ is hydrogen.
DIACETAM® 5 corresponds to the compound of the formula (B-4-a) wherein $E_{23}$ is hydrogen.
SUMISORB TM 61 corresponds to the compound of the formula (B-4-b) wherein $E_{23}$ is hydrogen.
UVINUL 4049 corresponds to the compound of the formula (B-5) wherein $E_{26}$ is hydrogen.
GOODRITE® 3034 corresponds to the compound of the formula (B-9-b) wherein $E_{35}$ is hydrogen.
GOODRITE® 3150 corresponds to the compound of the formula (B-9-c) wherein $E_{35}$ is hydrogen.
CHIMASSORB® 944 corresponds to the compound of the formula (C-1-a) wherein $R_{35}$ is hydrogen.
CHIMASSORB® 2020 corresponds to the compound of the formula (C-1-b) wherein $R_{35}$ is hydrogen.
DASTIB® 1082 corresponds to the compound of the formula (C-1-c) wherein $R_{35}$ is hydrogen.
CYASORB® UV 3346 corresponds to the compound of the formula (C-1-d) wherein $R_{35}$ is hydrogen.
UVASIL® 299 corresponds to the compound of the formula (C-4-a) wherein $R_{45}$ is hydrogen.
UVINUL® 5050 H corresponds to the compound of the formula (C-4-a) wherein $R_{47}$ is hydrogen.
LICHTSCHUTZSTOFF® UV 31 corresponds to the compound of the formula (C-4-b) wherein $R_{47}$ is hydrogen.
LUCHEM® HA B 18 corresponds to the compound of the formula (C-4-c) wherein $R_{47}$ is hydrogen.
ADK STAB® LA 68 corresponds to the compound of the formula (C-5-a) wherein $R_{59}$ is hydrogen.
UVASORB® HA 88 corresponds to the compound of the formula (C-6-a).

The compound of the formula (B-3-b-1) has the following structure:

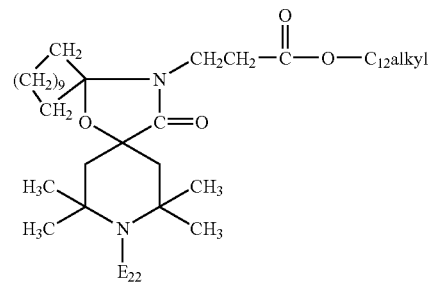

Of special interest are the compounds of the formulae (C-1-a), (C-1-b), (C-1-c), (C-1-d) and (C-6-a), in particular (C-1-a) and (C-1-b).

A reversible thermochromic system wherein component a) is a compound of the formula

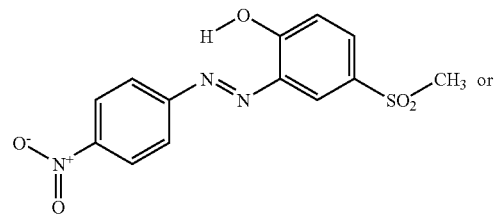

or

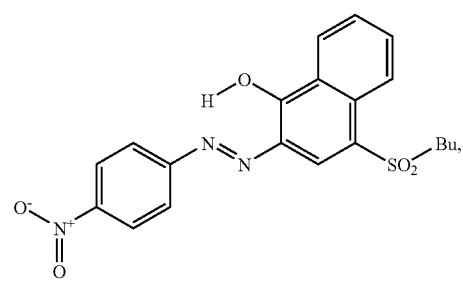

and component b) is a compound of the formula (C-1-a) or (C-1-b)

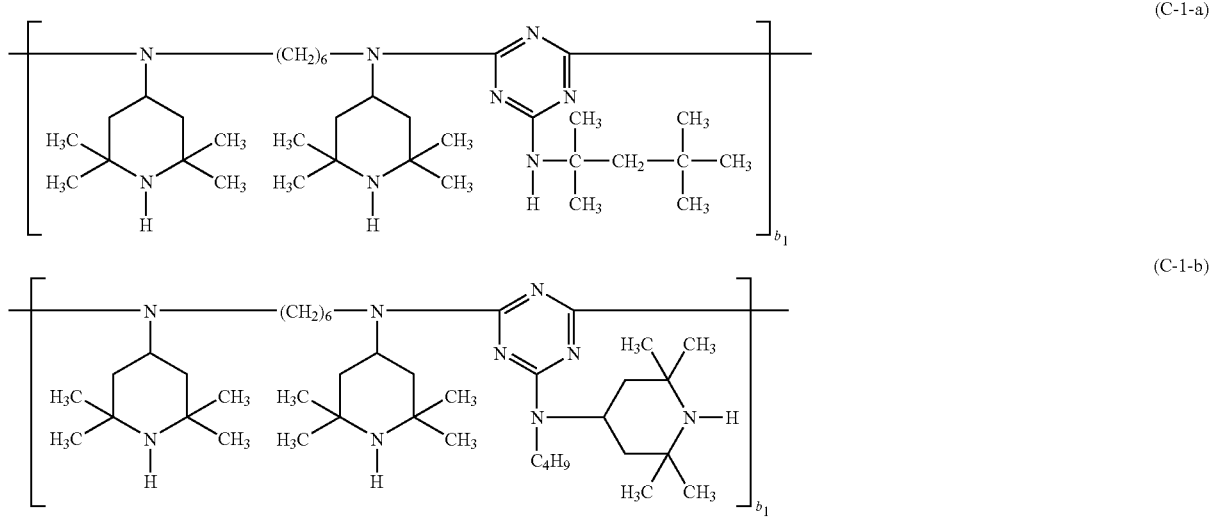

(C-1-a)

(C-1-b)

wherein $b_1$ is a number from 2 to 20;
is preferred.

The ratio of component a) to component b) is preferably 2:1 to 1:100 by weight, more preferably 1:1 to 1:20 by weight, most preferably 1:2 to 1:16 by weight, for example 1:3 to 1:6 by weight.

A further embodiment of this invention is a composition containing
a carrier selected from the group consisting of a polymer, a solvent and a wax; and a reversible thermochromic system as defined above.

The ratio of the carrier to the reversible thermochromic system is preferably 10000:1 to 1:1, more preferably 5000:1 to 2:1, most preferably 1000:1 to 5:1.

The carrier material is for example also a coating or an ink.

Examples of polymers suitable as carrier material are:
1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultra-high molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:
 a) radical polymerisation (normally under high pressure and at elevated temperature).
 b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerization medium. The catalysts can be used by themselves in the polymerization or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly($\alpha$-methylstyrene).

6. Aromatic homopolymers and copolymers derived from vinyl aromatic monomers including styrene, $\alpha$-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or $\alpha$-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from $\alpha,\beta$-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and polyester carbonates.

20. Polyketones.

21. Polysulfones, polyether sulfones and polyether ketones.

22. Crosslinked polymers derived from aldehydes on the one hand and phenols, ureas and melamines on the other hand, such as phenol/formaldehyde resins, urea/formaldehyde resins and melamine/formaldehyde resins.
23. Drying and non-drying alkyd resins.
24. Unsaturated polyester resins derived from copolyesters of saturated and unsaturated dicarboxylic acids with polyhydric alcohols and vinyl compounds as crosslinking agents, and also halogen-containing modifications thereof of low flammability.
25. Crosslinkable acrylic resins derived from substituted acrylates, for example epoxy acrylates, urethane acrylates or polyester acrylates.
26. Alkyd resins, polyester resins and acrylate resins crosslinked with melamine resins, urea resins, isocyanates, isocyanurates, polyisocyanates or epoxy resins.
27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.
28. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.
29. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

For instance, the polymer is an organic polymer such as a synthetic organic polymer, especially a thermoplastic polymer.

Preferably, the polymer is such as mentioned under items 1-3, in particular polypropylene, polypropylene copolymer, polyethylene or polyethylene copolymer, especially polypropylene or polyethylene.

Incorporation into the organic polymers can be effected, for example, by mixing in or applying to the components of the reversible thermochromic system as defined above and, if desired, further additives by the methods which are customary in the art. The incorporation can take place prior to or during the shaping operation, or by applying the dissolved or dispersed components of the reversible thermochromic system to the polymer, with or without subsequent evaporation of the solvent. In the case of elastomers, these can also be stabilized as lattices. A further possibility for incorporating the compounds mentioned above into polymers is to add them before, during or directly after the polymerization of the corresponding monomers or prior to crosslinking. In this context the compounds mentioned above can be added as it is or else in encapsulated form (for example in waxes, oils or polymers).

The compounds mentioned herein can also be added in the form of a masterbatch containing said compound in a concentration, for example, of from 2.5 to 25% by weight to the carrier material.

The compounds mentioned herein can judiciously be incorporated by the following methods:
as emulsion or dispersion (e.g. to lattices or emulsion polymers),
as a dry mixture during the mixing in of additional components or polymer mixtures,
by direct introduction into the processing apparatus (e.g. extruders, internal mixers, etc),
as solution or melt.

The components of the reversible thermochromic system, with or without further additives, can also be sprayed onto the carrier material such as plastic article, fiber, film, paper or coating. The system is able to dilute other additives (for example the conventional additives indicated below) or their melts so that they too can be sprayed together with these additives onto the carrier material.

Of interest is also a reversible thermochromic composition as defined above, comprising further additives.

Preferably, the further additives are
antioxidants, UV-absorbers, light stabilizers, metal deactivators, processing stabilizers, thiosynergists, peroxide scavengers, oxygen scavengers, basic co-stabilizers, nucleating agents, fillers, reinforcing agents, flameproofing agents and/ or additional colorants with the proviso that the additional colorants do not suppress and do not mask the thermochromic effect.

Most preferably, the further additives are
phenolic antioxidants, aminic antioxidants, phosphites, phosphonites, hydroxylamines, nitrones, benzofuranones, indolinones, 2-(2-hydroxyphenyl)benzotriazoles, 2-hydroxybenzophenones, 2-(2-hydroxyphenyl)-1,3,5-triazines, oxamides, sterically hindered amines, pigments and/or dyes.

General examples of suitable additives are:
1. Antioxidants
1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl) phenol, 2,4-dimethyl-6-(1'-methyltridec-1'-yl)phenol and mixtures thereof.
1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.
1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl)adipate.
1.4. Tocopherols, for example α-tocopherol, β-tocopherol, γ-tocopherol, δ-tocopherol and mixtures thereof (vitamin E).
1.5. Hydroxylated thiodiphenyl ethers, for example 2, 2'-thiobis(6-tert-butyl-4-methylphenol), 2,2'-thiobis(4-octylphenol), 4,4'-thiobis(6-tert-butyl-3-methylphenol), 4,4'-thiobis (6-tert-butyl-2-methylphenol), 4,4'-thiobis(3,6-di-sec-amylphenol), 4,4'-bis(2,6-dimethyl-4-hydroxyphenyl)-disulfide.
1.6. Alkylidenebisphenols, for example 2, 2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis

[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3, 5,3',5'-tetra-tert-butyl-4,4'-dihydroxydibenzyl ether, octadecyl-4-hydroxy-3,5-dimethyl benzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl) malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzypisocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene.

2. UV Absorbers and Light Stabilizers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(α,α-dimethylbenzyl)-phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-β-methoxycinnamate, butyl α-cyano-β-methyl-p-methoxycinnamate, methyl α-carbomethoxy-p-methoxycinnamate, N-(β-carbomethoxy-β-cyanovinyl)-2-methylindoline, neopentyl tetra(α-cyano-β,β-di-phenylacrylate).

2.5. Nickel compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)-oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis-[(1- cyclohexyloxy-2,2,6,6-piperidine-4-yl)butylamino]-6-chloro-s-triazine with N,N'-bis(3-aminopropyl)ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)-amino)-s-triazine.

2.7. Oxamides, for example 4, 4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl)phosphite, trilauryl phosphite, trioctadecyl phosphite, distearylpentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo-[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl)phosphite (Irgafos® 168, Ciba Specialty Chemicals Inc.), tris(nonylphenyl)phosphite,

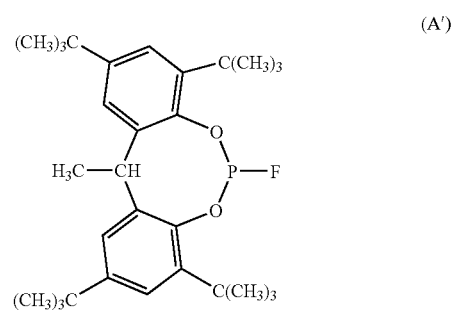

(A')

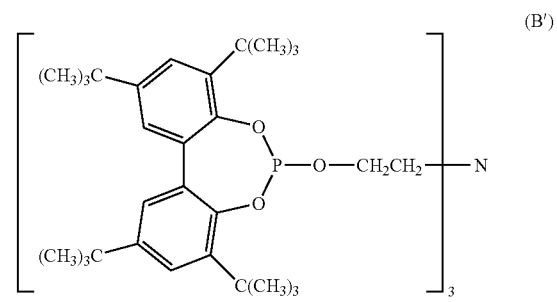

(B')

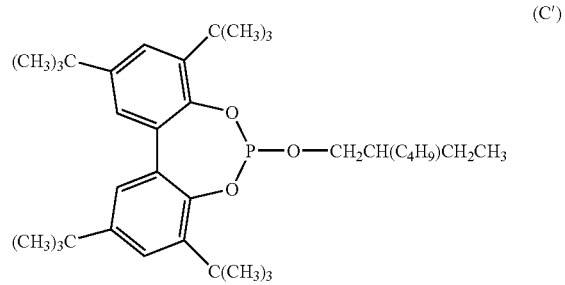

(C')

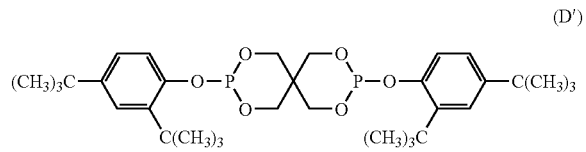

(D')

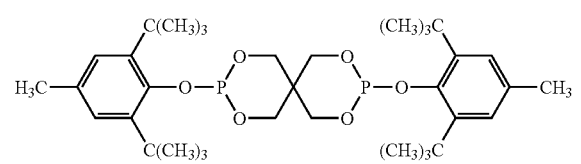

(E')

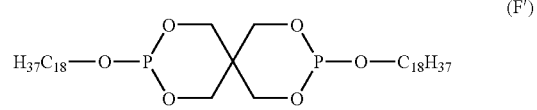

(F')

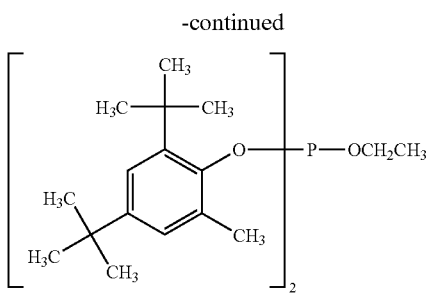

(G')

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate, dimistryl thiodipropionate, distearyl thiodipropionate or distearyl disulfide.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilizers, for example copper salts in combination with iodides and/or phosphorus compounds and salts of divalent manganese.

10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

12. Fillers and reinforcing agents, for example calcium carbonate, silicates, glass fibres, glass beads, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butylbenzofuran-2-one, 5,7-d i-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one, 3-(2-acetyl-5-isooctylphenyl)-5-isooctylbenzofuran-2-one.

The further additives are judiciously employed in amounts of 0.1-10% by weight, for example 0.2-5% by weight, based on the carrier material.

Another embodiment of this invention is an article comprising a composition containing a carrier material selected from the group consisting of a polymer, a solvent and a wax; and a reversible thermochromic system.

The article is preferably a household article.

Also preferred is a film, a paper, a fiber or a candle wax. Further preferred is a plastic article.

Of special interest is a reversible thermochromic article which is made by extrusion or injection molding.

The reversible thermochromic system as described above may be used to indicate temperature changes in appliances or devices. The temperature change effects color changes which may be assessed by the human eye or by optical devices resulting in an effect signal.

An application of the reversible thermochromic systems as described above is in the market of household appliances. For safety reasons there is often the need that the heated part of a certain device is evidenced through the appearance of a different and clearly distinguishable color.

For instance, in small appliances this is often desirable for hot beverage cups or their respective lids, kettles and percolators, toasters, indoor grills, slow cookers, food steamers, waffle makers, vacuum packaging systems, fryers, deep fryers, irons and rice cookers, where the high temperature may be indicated by the different color of a part of the item itself or of a label. The part or the label can be interchangeable, so that they can be changed with a new one available either in the original package or at the dealer, when the color change effect is no longer visible.

A particularly preferred embodiment of the present invention relates to the use of the reversible thermochromic system to indicate the high temperature of hot beverage cups or their respective lids by color change.

These reversible thermochromic systems can be used in large appliances like cook-tops, dryers, ovens, space heaters, steam cleaners, dishwashers and washing machines.

The application of a reversible thermochromic system is not limited to the incorporation into plastic parts of household appliances, but may find application also in many other contexts, for example:
- agricultural covers for light regulation purposes, in order to positively affect the development and harvesting of crops;
- inks in general, to be used in printing systems or in color-changing laminates, optionally as microencapsulated composition;
- fibers and fabrics in general (both woven and non-woven), for apparel having fancy and fashionable features and for apparel and non-apparel purposes with functional characteristics, including brand protection;
- toys, including fabrics for clothes and molded objects to increase the appeal and the amusement from the article;
- food and non-food packaging, as temperature indicators ("too hot": article has to be refrigerated; or: "just the right temperature": article is at its best for consumption);
- promotional items such as hidden messages in tags, cards or labels; spoons, straws or stirrers for hot-cold drinks.

Of interest is a reversible thermochromic article made of the composition as defined above.

Further embodiments of the present invention relate to the use of a mixture containing components a) and b) as defined above as reversible thermochromic system; and a process for reversibly thermochromically coloring a carrier material which comprises incorporating therein a thermochromic system as defined above.

A further embodiment of the present invention relates to a compound of the formula (I) or a tautomer thereof

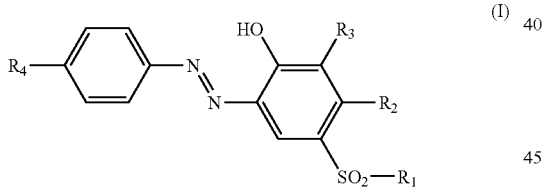

wherein
$R_1$ is $C_1$-$C_{18}$alkyl, $C_2$-$C_{18}$alkenyl, $C_3$-$C_{12}$cycloalkyl, $C_3$-$C_{12}$cycloalkyl substituted by 1, 2 or 3 $C_1$-$C_4$alkyl; or $C_7$-$C_{12}$-phenylalkyl;
$R_2$ and $R_3$ are hydrogen or $R_2$ and $R_3$ together form a group —CH=CH—CH=CH—; and
$R_4$ is hydrogen, —$NO_2$, —$SO_2$—$R_1$ or (4-nitrophenyl)azo.

The compounds described herein can be synthesized in analogy to methods known in the art from known starting materials, see for example E. Jusa, L. Gruen, Monatshefte fuer Chemie (1934), 64, 267; GB 910,222; DE 951,471; G. Schetty, Helvetica Chimica Acta (1962), 45, 1026; A. M. Hammam, I. M. Issa, S. A. Amin, H. Dissoki, Journal of Indian Chemical Society (1977), 54, 729; M. Kamel, S. A. Amin, Journal fuer Praktische Chemie (1967), 36, 230.

In the following examples, percentages given are weight percentages unless otherwise stated. Percentages are always given in percentages of the formulation, composition and/or combination unless otherwise stated.

Commercially available additives used in the following examples:
IRGANOX® B215 is a mixture of IRGAFOS® 168 (66.6%) and IRGANOX® 1010 (33.3%)

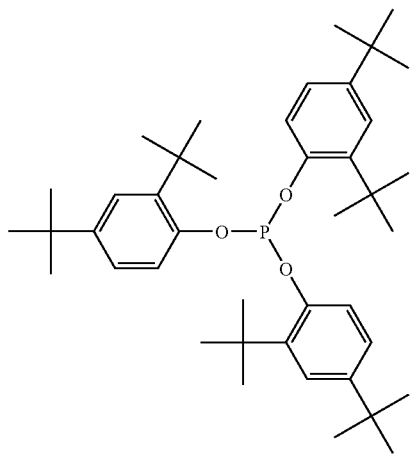

IRGAFOS® 168
(CAS No. 31570-04-4)

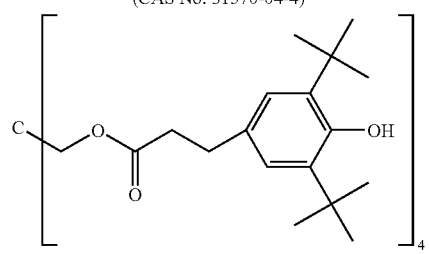

IRGANOX® 1010
(CAS No. 6683-19-8)

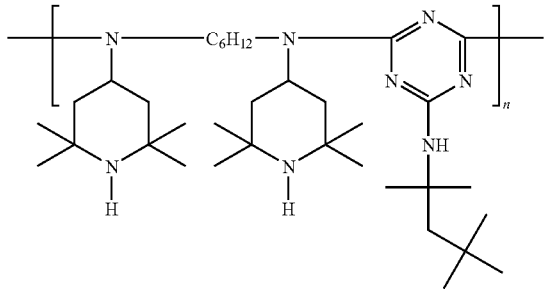

CHIMASSORB® 944
(CAS No. 71878-19-8, 70624-18-9).

EXAMPLE 1

Preparation of the Starting Material
2-phenylazo-4-methylthio-phenol

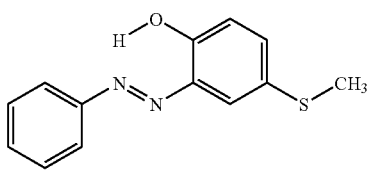

5 g (53.7 mmoles) of aniline is dissolved in conc. HCl (13 ml)/water (90 ml) and diazotized with 3.89 g (56.4 mmoles) of sodium nitrite (dissolved in water (8 ml)), at 0-5° C. The resulting solution is slowly added to a solution of 7.52 g (53.7 mmoles) of 4-methylthiophenol in 2N NaOH (54 ml). After stirring overnight the mixture is neutralised with 2N HCl, the precipitate is filtered off, dried, and dissolved in toluene (800 ml). The solution is dried over anhydrous sodium sulfate, filtered through silica gel, and evaporated. Recrystallisation from methanol gives 7.53 g (57%) of dark brown crystals, m.p. 70-80° C.

EXAMPLE 2

Preparation of the Starting Material 2-(4'-nitrophenylazo-)-4-methylthio-phenol

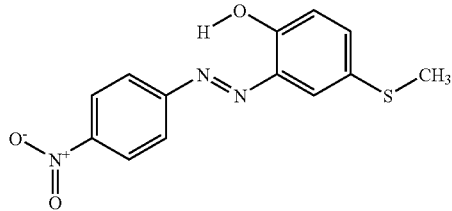

This is prepared similarly to Example 1 using 19.6 g (142 mmoles) of 4-nitro-aniline, 10% sodium nitrite solution (103.5 ml), and 20 g (142 mmoles) of 4-methylthio-phenol.

Yield: 18.81 g (46%) of red-brown crystals, m.p. 140-143° C.

EXAMPLE 3

Preparation of the Starting Material 2-(phenylazo-)-4-butylthio-1-naphthol

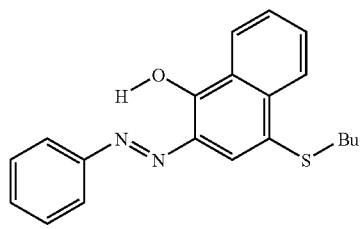

This is prepared similarly to Example 1 using 0.8 g (8.6 mmoles) of aniline, 0.65 g (9.5 mmoles) of sodium nitrite, and 2 g (8.6 mmoles) of 4-butylthio-1-naphthol.

Yield: 2.74 g (94%) of dark red crystals, m.p. 81-82° C.

EXAMPLE 4

Preparation of the Starting Material 2-(4-nitrophenylazo-)-4-butylthio-1-naphthol

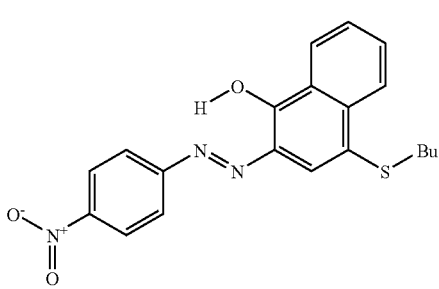

This is prepared similarly to Example 1 using 1.3 g (9.46 mmoles) of 4-nitro-aniline, 0.72 g (10.3 mmoles) of sodium nitrite, and 2 g (8.6 mmoles) of 4-butylthio-1-naphthol.

Yield: 1.3 g (39%) of dark purple crystals, m.p. 182-183° C.

EXAMPLE 5

Preparation of the Starting Material 2-(4'-nitrophenylazo-4-phenylazo-)-4-methylthio-phenol

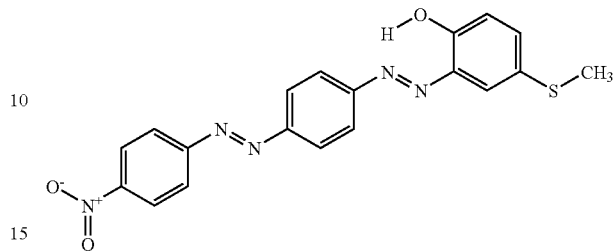

This is prepared similarly to Example 1 using 1 g (4.13 mmoles) of 4-(4'-nitrophenylazo-)-aniline, 0.31 g (4.54 mmoles) of sodium nitrite, and 0.58 g (4.13 mmoles) of 4-methylthiophenol.

Yield: 0.78 g (48%) of crystals, m.p. 188-192° C.

EXAMPLE 6

Preparation of 2-phenylazo-4-methylsulfonyl-phenol

2 g (8.18 mmoles) of 2-phenylazo-4-methylthio-phenol (product of Example 1) is dissolved in chloroform (20 ml), 2.96 g (17.18 mmoles) of 3-chloroperbenzoic acid is added, and the mixture is stirred at reflux for 18 h. The mixture is diluted with 15% potassium carbonate solution (50 ml), stirred at 25° C., the chloroform distilled off in vacuo, and the residue neutralised with 2N HCl. The precipitate is filtered off, washed with water, then methanol, and dried.

Yield: 1.45 g (64%) of dark orange crystals, m.p. 157-161° C.

EXAMPLE 7

Preparation of 2-(4'-nitrophenylazo-)-4-methylsulfonyl-phenol

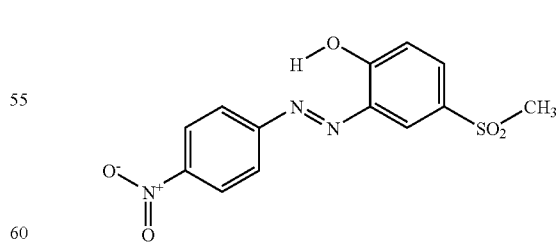

15 g (52 mmoles) of 2-(4'-nitrophenylazo-)-4-methylthio-phenol (product of Example 2) is oxidised similarly to Example 6, using 22.36 g (129 mmoles) of 3-chloroperbenzoic acid in chloroform (200 ml).

Yield: 12.82 g (76%) of golden orange crystals, m.p. 225-227° C.

EXAMPLE 8

Preparation of 2-(4'-nitrophenylazo-)-4-methylsulfonyl-1-naphthol

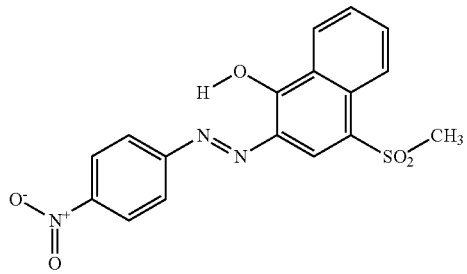

0.5 g (1.47 mmoles) of 2-(4'-nitrophenylazo-)-4-methylthio-1-naphthol (prepared according to E. Jusa et al., Monatshefte für Chemie 64 (1934), 267-286) is oxidised similarly to Example 6, using 0.63 g (3.7 mmoles) of 3-chloroperbenzoic acid in chloroform (10 ml).

Yield: 0.2 g (37%) of dark red crystals, m.p. 296° C.

EXAMPLE 9

Preparation of 2-(4'-nitrophenylazo-)-4-butylsulfonyl-1-naphthol

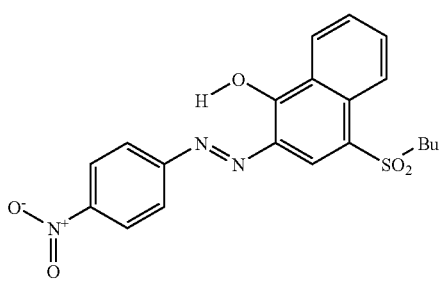

1 g (2.6 mmoles) of 2-(4-nitrophenylazo-)-4-butylthio-1-naphthol (product of Example 4) is oxidised similarly to Example 6, using 1.13 g (3.7 mmoles) of 3-chloroperbenzoic acid in chloroform (30 ml).

Yield: 0.97 g (90%) of red crystals, m.p. 252-253° C.

EXAMPLE 10

Preparation of 2-(phenylazo-)-4-butylsulfonyl-1-naphthol

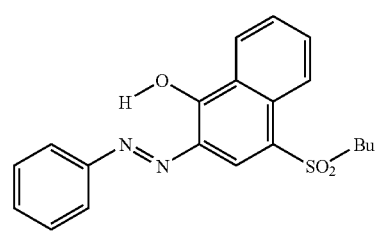

1 g (3 mmoles) of 2-(phenylazo-)-4-butylthio-1-naphthol (product of Example 3) is oxidised similarly to Example 6, using 1.28 g (7.4 mmoles) of 3-chloroperbenzoic acid in chloroform (10 ml).

Yield: 0.64 g (58%) of red crystals, m.p. 156-158° C.

EXAMPLE 11

Preparation of 2-(4'-nitrophenylazo-4-phenylazo-)-4-methylsulfonyl-phenol

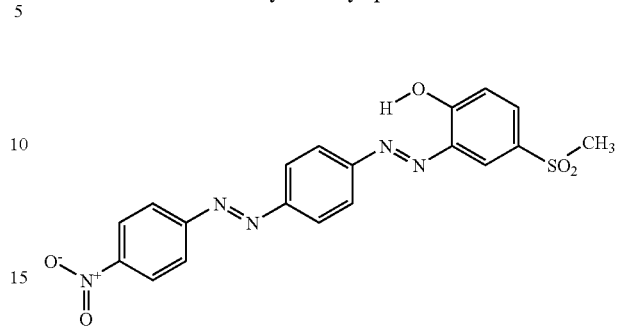

1 g (3 mmoles) of 2-(4'-nitrophenylazo-4-phenylazo-)-4-methylthio-phenol (product of Example 5) is oxidised similarly to Example 6, using 0.65 g (3.8 mmoles) of 3-chloroperbenzoic acid in chloroform (10 ml).

Yield: 0.45 g (83%) of dark orange crystals, m.p. 260-262° C.

APPLICATION EXAMPLES

Example A

Extruded Polypropylene Tapes

A polypropylene powder Profax PH 350 from Basell is dried in a vacuum oven for eight hours at 60° C. 0.05% IRGANOX® B215 and 0.5% CHIMASSORB® 944 (both products from Ciba Specialty Chemicals) are added to the dried polypropylene powder. The compounds are added in an amount as indicated in Table 1 to obtain the final formulations. The formulations are mixed in a turbo mixer and extruded in a twin-screw extruder equipped with a flat die. In this way, polypropylene tapes are produced with a width of 5 mm and a thickness of around 1 mm. The processing temperature is around 220° C.

TABLE 1

| Compound of | Amount | Colour at 25° C. | Colour at 100-140° C. |
|---|---|---|---|
| Example 7 | 0.1% | red | yellow |
| Example 9 | 0.1% | dark purple | yellow-orange |

Example B

Extruded of Polyethylene (Low Density) Tapes

A polyethylene powder Riblene FF29 from Polimeri Europe is dried in a vacuum oven for eight hours at 60° C. 0.05% IRGANOX® B215 and 0.5% CHIMASSORB® 944 (both products from Ciba Specialty Chemicals) are added to the dried polypropylene powder. The compounds are added in an amount as indicated in Table 2 to obtain the final formulations. The formulations are mixed in a turbo mixer and extruded in a twin-screw extruder equipped with a flat die. In this way, polyethylene tapes are produced with a width of 5 mm and a thickness of around 1 mm. The processing temperature is around 230° C.

TABLE 2

| Compound of | Amount | Colour at 25° C. | Colour at 90-110° C. |
|---|---|---|---|
| Example 7 | 0.1% | orange-red | yellow |
| Example 8 | 0.1% | dark purple | yellow-orange |

Example C

Extruded of Polyethylene (High Density) Tapes

A polyethylene powder MG 9641 from Borealis is dried in a vacuum oven for eight hours at 60° C. 0.05% IRGANOX B215 and 0.5% CHIMASSORB® 944 (both products from Ciba Specialty Chemicals) are added to the dried polypropylene powder. The compounds are added in an amount as indicated in Table 3 to obtain the final formulations. The formulations are mixed in a turbo mixer and extruded in a twin-screw extruder equipped with a flat die. In this way, polyethylene tapes are produced with a width of 5 mm and a thickness of around 1 mm. The processing temperature is around 230° C.

TABLE 3

| Compound of | Amount | Colour at 25° C. | Colour at 90-110° C. |
|---|---|---|---|
| Example 9 | 0.1% | purple | yellow-orange |

Example D

Injection Molding of Polypropylene Plaques

To a polypropylene powder Moplen HP500H from Basell (having a melt index of 1.8 (230° C./2.16 Kg)), 0.5% CHIMASSORB 944 from Ciba Specialty Chemicals and an amount of the compound as indicated in Table 4 are added to obtain the final formulations. The formulations are mixed in a turbo mixer and extruded in a OMC twin-screw extruder at 190-230° C. to give polymer granules which are subsequently converted into plaques 2 mm thick by means of a Negribossi injection molding machine, operating at a maximum temperature of 230° C.

TABLE 4

| Compound of | Amount | Colour at 25° C. | Colour at 110-140° C. |
|---|---|---|---|
| Example 7 | 0.1% | red-purple | orange |

The invention claimed is:

1. A reversible thermochromic system comprising
   a) a compound of formula (I) or a tautomer thereof (I)

wherein
   $R_1$ is $C_1$-$C_{18}$alkyl, $C_2$-$C_{18}$alkenyl, $C_3$-$C_{12}$cycloalkyl, $C_3$-$C_{12}$cycloalkyl substituted by 1, 2 or 3 $C_1$-$C_4$alkyl; or $C_7$-$C_{12}$-phenylalkyl;
   $R_2$ and $R_3$ are hydrogen or $R_2$ and $R_3$ together form a group —CH=CH—CH=CH—; and
   $R_4$ is hydrogen, —$NO_2$, —$SO_2$—$R_1$ or (4-nitrophenyl)azo; and b) a compound containing a group of formula 2. A reversible thermochromic system according to claim 1 wherein
   $R_1$ is $C_1$-$C_{10}$alkyl, allyl, cyclohexyl or benzyl;
   $R_2$ and $R_3$ are hydrogen or $R_2$ and $R_3$ together form a group —CH=CH—CH=CH—; and
   $R_4$ is hydrogen, —$NO_2$ or (4-nitrophenyl)azo.

3. A reversible thermochromic system according to claim 1 wherein
   $R_1$ is $C_1$-$C_4$alkyl;
   $R_2$ and $R_3$ are hydrogen or $R_2$ and $R_3$ together form a group —CH=CH—CH=CH—; and
   $R_4$ is hydrogen, —$NO_2$, or (4-nitrophenyl)azo.

4. A reversible thermochromic system according to claim 1 wherein component b) is a compound of formula (C-1-a), (C-1-b), (C-1-c), (C-1-d) or (C-6-a)

(C-1-a)

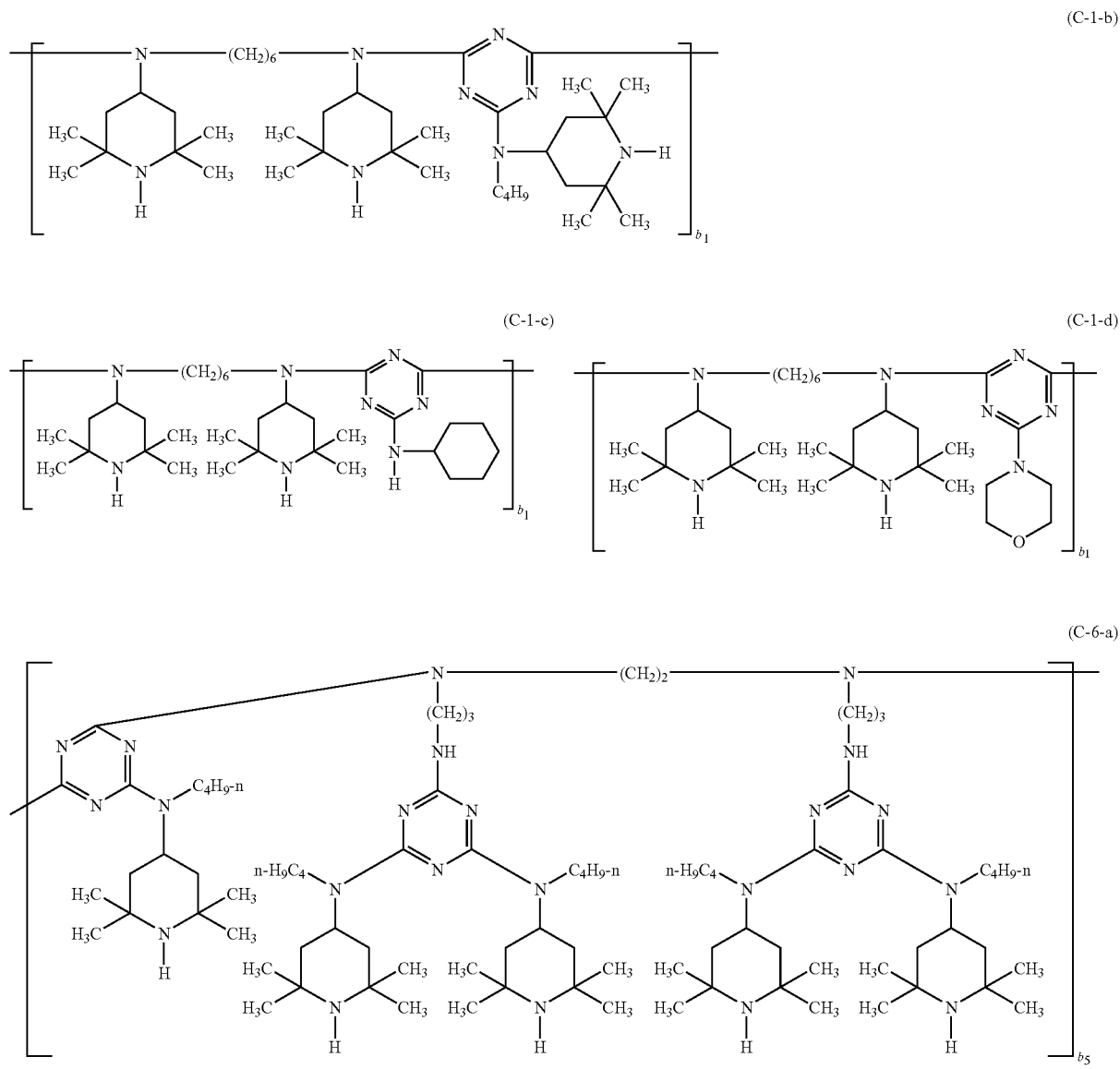
wherein $b_1$ and $b_5$ are a number from 2 to 20.
5. A reversible thermochromic system according to claim 4 wherein component b) is a compound of the formula (C-1-a) or (C-1-b).
6. A reversible thermochromic system according to claim 1 wherein component a) is a compound of formula
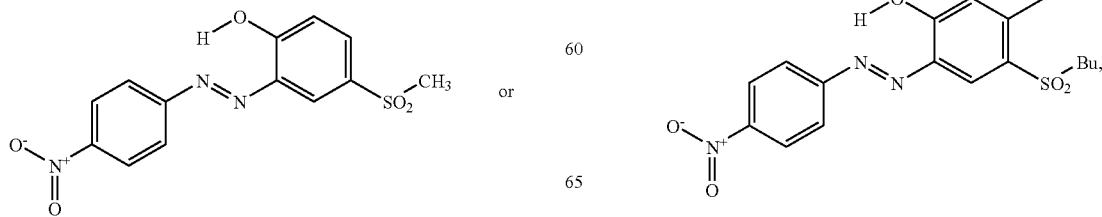

and
component b) is a compound of formula (C-1-a) or (C-1-b)

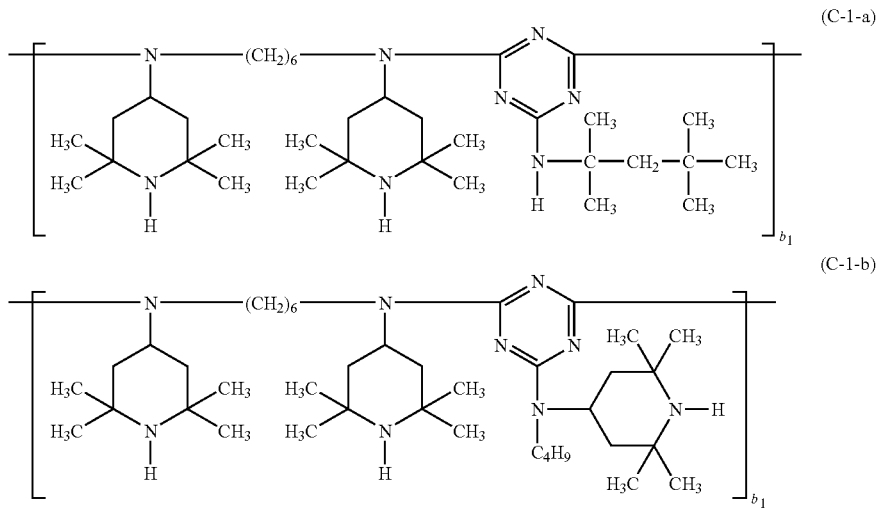

wherein $b_1$ is a number from 2 to 20.

7. A reversible thermochromic system according to claim 1 wherein
the weight ratio of component a) to component b) is 1:1 to 1:20.

8. A composition containing
a carrier selected from the group consisting of a polymer, a solvent and a wax; and
a reversible thermochromic system as defined in claim 1.

9. A composition according to claim 8 wherein the carrier material is a coating or an ink.

10. A composition according to claim 8, which additionally contains a further additive selected from the group consisting of antioxidants, UV-absorbers, light stabilizers, metal deactivators, processing stabilizers, thiosynergists, peroxide scavengers, oxygen scavengers, basic co-stabilizers, nucleating agents, fillers, reinforcing agents, flameproofing agents and additional colorants.

11. An article comprising a composition containing
a carrier material selected from the group consisting of a polymer, a solvent and a wax; and
a reversible thermochromic system as defined in claim 1.

12. An article according to claim 11, which is a household article.

13. An article according to claim 11, which is a film, a paper, a fiber or a candle wax.

14. A process for reversibly thermochromically coloring a carrier material which comprises incorporating therein
a) a compound of formula (I) or a tautomer thereof

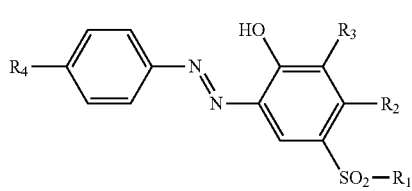

wherein
$R_1$ is $C_1$-$C_{18}$alkyl, $C_2$-$C_{18}$alkenyl, $C_3$-$C_{12}$cycloalkyl, $C_3$-$C_{12}$cycloalkyl substituted by 1, 2 or 3 $C_1$-$C_4$alkyl; or $C_7$-$C_{12}$phenylalkyl;
$R_2$ and $R_3$ are hydrogen or $R_2$ and $R_3$ to ether form a group —CH═CH—CH═CH—; and
$R_4$ is hydrogen, —$NO_2$, —$SO_2$—$R_1$ or (4-nitrophenyl)azo; and
b) a compound containing a group of formula

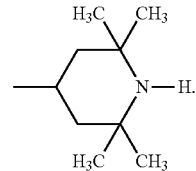

15. A compound of formula (I) or a tautomer thereof

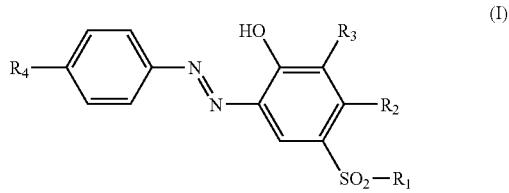

wherein
$R_1$ is $C_1$-$C_{18}$alkyl, $C_2$-$C_{18}$alkenyl, $C_3$-$C_{12}$cycloalkyl, $C_3$-$C_{12}$cycloalkyl substituted by 1, 2 or 3 $C_1$-$C_4$alkyl; or $C_7$-$C_{12}$-phenylalkyl;
$R_2$ and $R_3$ are hydrogen or $R_2$ and $R_3$ together form a group —CH═CH—CH═CH—; and
$R_4$ is hydrogen, —$NO_2$, —$SO_2$—$R_1$ or (4-nitrophenyl)azo.

* * * * *